United States Patent
Noh et al.

(10) Patent No.: US 8,619,693 B2
(45) Date of Patent: Dec. 31, 2013

(54) METHOD FOR TRANSMITTING REFERENCE SIGNALS IN A DOWNLINK MULTIPLE INPUT MULTIPLE OUTPUT SYSTEM

(75) Inventors: Yu Jin Noh, Anyang-si (KR); Dong Wook Roh, Anyang-si (KR); Joon Kui Ahn, Anyang-si (KR); Byeong Woo Kang, Anyang-si (KR); Dae Won Lee, Anyang-si (KR); Bong Hoe Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 13/132,261

(22) PCT Filed: Dec. 2, 2009

(86) PCT No.: PCT/KR2009/007150
§ 371 (c)(1),
(2), (4) Date: Jun. 1, 2011

(87) PCT Pub. No.: WO2010/064842
PCT Pub. Date: Jun. 10, 2010

(65) Prior Publication Data
US 2011/0237270 A1   Sep. 29, 2011

Related U.S. Application Data

(60) Provisional application No. 61/119,357, filed on Dec. 2, 2008, provisional application No. 61/147,172, filed on Jan. 26, 2009, provisional application No. 61/157,183, filed on Mar. 3, 2009, provisional application No. 61/173,601, filed on Apr. 29, 2009.

(30) Foreign Application Priority Data

Sep. 22, 2009  (KR) .................. 10-2009-0089528

(51) Int. Cl.
*H04W 4/00* (2009.01)
*H04J 11/00* (2006.01)
*H04K 1/10* (2006.01)
*H04L 27/28* (2006.01)

(52) U.S. Cl.
USPC ........... 370/329; 370/338; 370/341; 370/208; 375/260

(58) Field of Classification Search
None
See application file for complete search history.

(56) References Cited

U.S. PATENT DOCUMENTS

| | | | |
|---|---|---|---|
| 8,059,611 B2 | 11/2011 | Ishii et al. | |
| 2004/0166886 A1 | 8/2004 | Laroia et al. | |
| 2005/0163194 A1 | 7/2005 | Gore et al. | |
| 2005/0192019 A1 | 9/2005 | Kim et al. | |
| 2006/0023680 A1* | 2/2006 | Oh et al. | 370/338 |
| 2007/0066329 A1* | 3/2007 | Laroia et al. | 455/502 |
| 2007/0248113 A1 | 10/2007 | Ko et al. | |
| 2008/0013500 A1* | 1/2008 | Laroia et al. | 370/338 |
| 2008/0069033 A1* | 3/2008 | Li et al. | 370/328 |
| 2008/0273491 A1 | 11/2008 | Han et al. | |
| 2009/0075664 A1* | 3/2009 | Palanki et al. | 455/446 |
| 2009/0303918 A1* | 12/2009 | Ma et al. | 370/315 |
| 2009/0323838 A1* | 12/2009 | Ho et al. | 375/260 |
| 2010/0103949 A1 | 4/2010 | Jung et al. | |

FOREIGN PATENT DOCUMENTS

| | | |
|---|---|---|
| CN | 1674463 A | 9/2005 |
| CN | 101106410 A | 1/2008 |
| EP | 1 357 693 A1 | 10/2003 |
| JP | 2008-72403 A | 3/2008 |
| KR | 10-2008-0033060 A | 4/2008 |
| KR | 10-2008-0056423 A | 6/2008 |
| KR | 10-2008-0097682 A | 11/2008 |
| WO | WO 2008/044882 A1 | 4/2008 |
| WO | WO 2008/105267 A1 | 9/2008 |

OTHER PUBLICATIONS

Qualcomm Europe, "RS Power Balancing in Spatial Domain and Interference Estimation Issues," 3GPP TSG-RAN WG1 #52, R1-080639, Agenda Item 6.1.1, Sorrento, Italy, Feb. 11-15, 2008, 5 pages.

Samsung, "DL Reference Signal Structure of the Intra Node B Cells: CDM vs. FDM," 3GPP TSG-RAN WG1 Meeting #46, Tdoc R1-62223, Agenda Item 8.4.1, Tallinn, Estonia, Aug. 28-Sep. 1, 2006, 5 pages.

Ericsson, "Sounding RS," Agenda Item 7.2.2., TSG-RAN-WG1 #50, R1-073729, Athens, Greece, Aug. 20-24, 2007, pp. 1-4.

LG Electronics, "UL Sounding RS Operation," Agenda Item 7.2.2., 3GPP TSG RAN WG 1#50, R1-073474, Athens, Greece, Aug. 20-24, 2007, pp. 1-6.

Ericsson, "Further Considerations on RS Design for LTE-Advanced," 3GPP TSG-RAN WG1 #56 bis, R1-091594, Mar. 23-27, 2009, 4 pages.

Texas Instruments, "Common Reference Symbol Mapping/Signaling for 8 Transmit Antenna," 3GPP TSG RAN1 #55, R1-084447, Nov. 10-14, 2008, 6 pages.

\* cited by examiner

*Primary Examiner* — Yemane Mesfin
*Assistant Examiner* — Peter Chen

(74) *Attorney, Agent, or Firm* — Birch, Stewart, Kolasch & Birch, LLP

(57) ABSTRACT

In a system having a plurality of cells participating in a Coordinated Multi-Point (CoMP) operation, a method for transmitting Reference Signals (RSs) to User Equipment (UE) includes generating, by Base Station (BS) included in each of the plurality of cells, a subframe including RSs for a UE located in the each of the plurality of cells, and transmitting the generated subframe to the UE by the BS. The RSs include RSs for channel measurement, and RSs for data demodulation, the plurality of cells are grouped according to frequency shift values applied to the RSs for channel measurement and RS allocation patterns are determined for two cells among the plurality of cells according to a predetermined rule.

16 Claims, 41 Drawing Sheets

FIG. 37
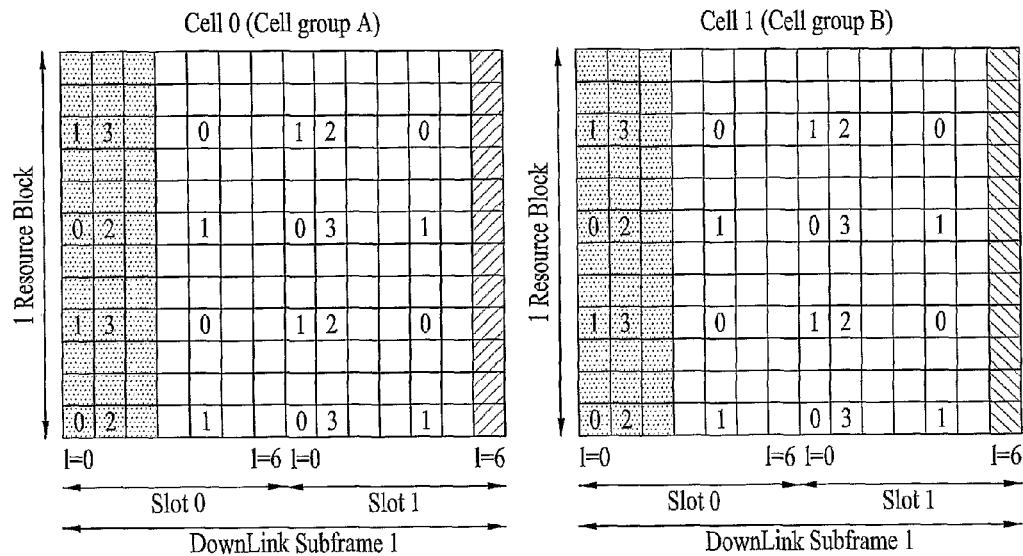
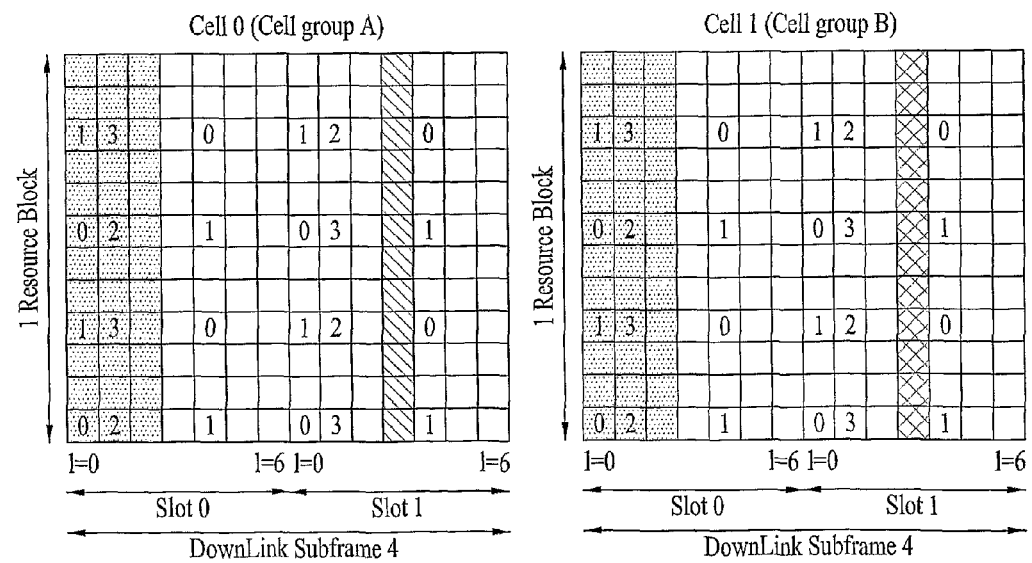

FIG. 38
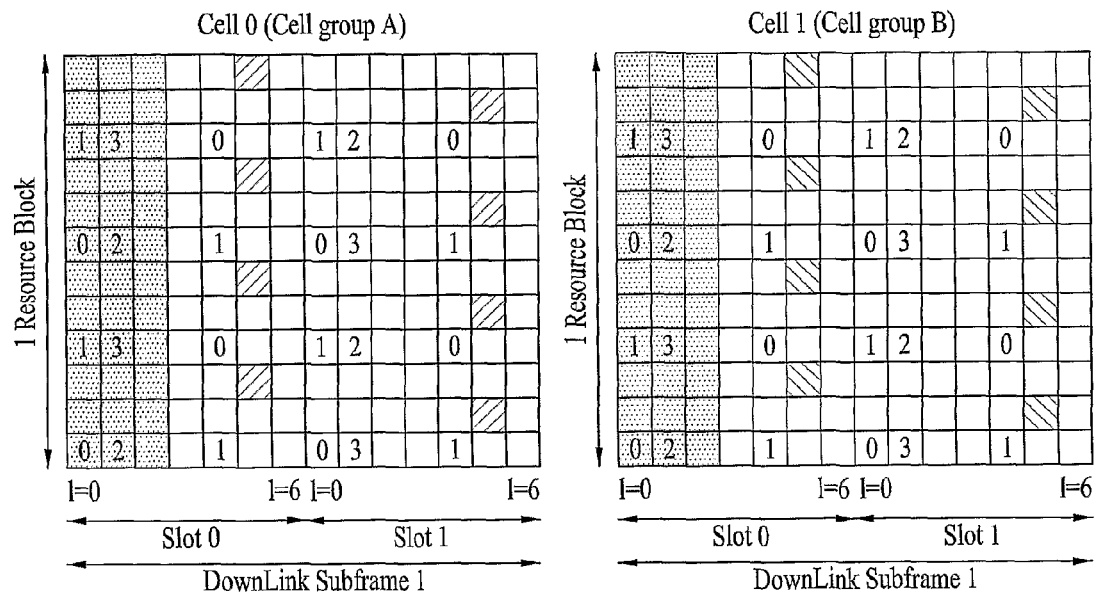
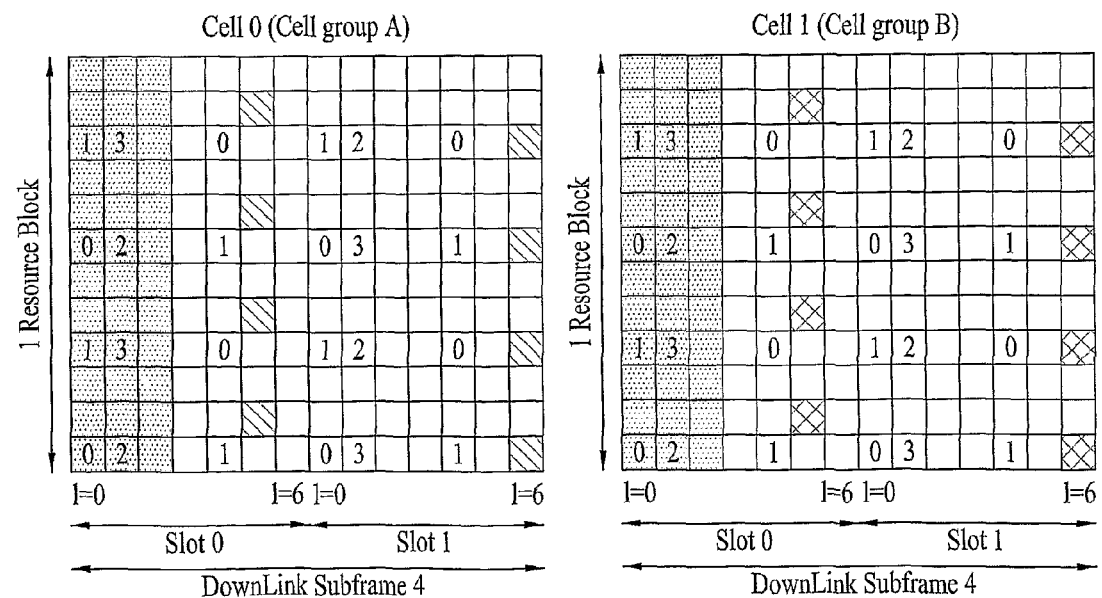

METHOD FOR TRANSMITTING REFERENCE SIGNALS IN A DOWNLINK MULTIPLE INPUT MULTIPLE OUTPUT SYSTEM

CROSS REFERENCE TO RELATED APPLICATIONS

This application is the National Phase of PCT/KR2009/007150 filed on Dec. 2, 2009, which claims priority under 35 U.S.C. 119(e) to U.S. Provisional Nos. 61/119,357 filed on Dec. 2, 2008; 61/147,172 filed Jan. 26, 2009; 61/157,183 filed Mar. 3, 2009; and 61/173,601 filed Apr. 29, 2009 and under 35 U.S.C. 119(a) to Patent Application No. 10-2009-0089528 filed in Republic of Korea, on Sep. 22, 2009. The entire contents of all of the above applications are hereby incorporated by reference into the present application.

TECHNICAL FIELD

The present invention relates to a method for efficiently transmitting Reference Signals (RSs) in a Multiple Input Multiple Output (MIMO) communication system, under an environment where antennas are added to an existing system.

BACKGROUND ART

Long Term Evolution (LTE) Physical Structure $3^{rd}$ Generation Partnership Project (3GPP) supports a type-1 radio frame structure for application in Frequency Division Duplex (FDD) and a type-2 radio frame structure for application in Time Division Duplex (TDD).

FIG. 1 illustrates the type-1 radio frame structure. A type-1 radio frame includes 10 subframes each having two slots.

FIG. 2 illustrates the type-2 radio frame structure. A type-2 radio frame includes two half frames each having 5 subframes, a Downlink Pilot Time Slot (DwPTS), a Guard Period (GP), and an Uplink Pilot Time Slot (UpPTS). Each subframe includes two slots. The DwPTS is used for initial cell search, synchronization, or channel estimation in a User Equipment (UE), whereas the UpPTS is used for channel estimation in a Base Station (BS) and uplink transmission synchronization in a UE. The GP is a period between a downlink and an uplink, for eliminating interference with the uplink caused by a multi-path delay of a downlink signal. Irrespective of the types of radio frames, each subframe includes two slots.

FIG. 3 illustrates an LTE downlink slot structure. Referring to FIG. 3, a signal transmitted in each downlink slot may be described by a resource grid with $N_{RB}^{DL} N_{sc}^{RB}$ subcarriers by $N_{symb}^{DL}$ Orthogonal Frequency Division Multiplexing (OFDM) symbols. $N_{RB}^{DL}$ represents the number of downlink Resource Blocks (RBs) and $N_{sc}^{RB}$ represents the number of subcarriers per RB. $N_{symb}^{DL}$ represents the number of OFDM symbols in the downlink slot.

FIG. 4 illustrates an LTE uplink slot structure. Referring to FIG. 4, a signal transmitted in each uplink slot may be described by a resource grid with $N_{RB}^{UL} N_{sc}^{RB}$ subcarriers by $N_{symb}^{UL}$ Single Carrier-Frequency Division Multiple Access (SC-FDMA) symbols. $N_{RB}^{UL}$ represents the number of uplink RBs and $N_{sc}^{RB}$ represents the number of subcarriers per RB. $N_{symb}^{UL}$ represents the number of SC-FDMA symbols in the uplink slot.

A Resource Element (RE) is a resource unit indicated by index (a, b) in the downlink and uplink slots, occupying one subcarrier by one OFDM or SC-FDMA symbol. Here, a denotes a frequency index and b denotes a time index.

FIG. 5 illustrates an example of a downlink subframe structure. Referring to FIG. 5, the first three OFDM symbols of a first slot form a control region allocated to control channels, and the other OFDM symbols of the first slot form a data region allocated to a Physical Downlink Shared CHannel (PDSCH) in a subframe. In 3GPP LTE, the downlink control channels include, for example, a Physical Control Format Indicator CHannel (PCFICH), a Physical Downlink Control CHannel (PDCCH), and a Physical Hybrid Automatic Repeat reQuest (ARQ) Indicator CHannel (PHICH).

The PCFICH, which is transmitted in the first OFDM symbol of a subframe, carries information about the number of OFDM symbols used for the control channels of the subframe. The PHICH delivers a Hybrid ARQ (HARQ) ACKnowledgment/Negative ACKnowledgment (ACK/NACK) signal as a response for an uplink transmission. The PDCCH delivers control information called Downlink Control Information (DCI) which includes downlink or uplink scheduling information or information about an uplink transmit power control command for a user group. Specifically, the PDCCH may carry transport format information, a resource assignment of a Downlink Shared CHannel (DL-SCH), paging information on a Paging CHannel (PCH), system information on the DL-SCH, a resource assignment of an upper-layer control message such as a random access response transmitted on a PDSCH, a set of transmit power control commands for individual UEs of a UE group, and Voice over Internet Protocol (VoIP) activation information. A plurality of PDCCHs may be transmitted in the control region. A UE may monitor the plurality of PDCCHs. A PDCCH is transmitted in a set of one or more consecutive Control Channel Elements (CCEs). The CCEs are logical allocation units used to provide a coding rate to the PDCCH based on a radio channel state. A CCE is a plurality of RE groups. The format of the PDCCH and the number of bits available to the PDCCH are determined according to the correlation between the number of CCEs and a coding rate that the CCEs provide. A BS determines the format of the PDCCH based on DCI transmitted to a UE on the PDCCH and attaches a Cyclic Redundancy Check (CRC) to the control information.

The CRC is masked with an Identifier (ID) specific to the usage of the PDCCH or the user (a Radio Network Temporary Identifier (RNTI)). If the PDCCH is destined for a particular UE, the CRC may be masked with an ID specific to the UE (e.g. a Cell-RNTI (C-RNTI)). If the PDCCH is used for a paging message, the CRC may be masked with a paging indicator ID (e.g. a Paging-RNTI (P-RNTI)). If the PDCCH is used to carry system information, particularly System Information Blocks (SIBs), the CRC may be masked with a system information ID and a System Information-RNTI (an SI-RNTI). To indicate a random access response to a random access preamble received from a UE, the CRC may be masked with a Random Access-RNTI (a RA-RNTI).

FIG. 6 illustrates an uplink subframe structure. Referring to FIG. 6, an uplink subframe may be divided into a control region and a data region in the frequency domain. The control region is allocated to Physical Uplink Control CHannels (PUCCHs) for carrying uplink control information. The data region is allocated to a Physical Uplink Shared CHannel (PUCCH) for transmitting data. To maintain a single carrier property, a UE does not transmit a PUCCH and a PUSCH simultaneously. A pair of RBs are allocated to a PUCCH for a UE in a subframe. The RBs respectively occupy different subcarriers in two slots, with frequency hopping at the boundary between the slots.

Definition of MIMO

The term "MIMO" is short for Multiple Input Multiple Output. Beyond conventional schemes using a single Transmit (Tx) antenna and a single Reception (Rx) antenna, MIMO uses a plurality of Tx antennas and a plurality of Rx antennas to thereby increase the transmission and reception efficiency of data. With the use of multiple antennas at a transmitter or a receiver, MIMO seeks to increase capacity or improve performance in a wireless communication system. The term "MIMO" is interchangeable with "multiple antenna".

The MIMO technology does not depend on a single antenna path to receive an entire message. Rather, it completes the message by combining data fragments received through a plurality of antennas. Because MIMO may increase data rate within a certain area or extend system coverage at a given data rate, it is considered as a promising future-generation mobile communication technology that may find its use in a wide range including mobile terminals, relays, etc. With the growth of data communication, MIMO is attracting attention as a future-generation technology that may overcome a limit on transmission capacity that is almost reached due to the increased data communication.

MIMO System Model

FIG. 7 illustrates the configuration of a typical MIMO communication system. Referring to FIG. 7, a simultaneous increase in the number of Tx antennas of a transmitter to $N_T$ and in the number of Rx antennas of a receiver to $N_R$ increases a theoretical channel transmission capacity in proportion to the number of antennas, compared to use of a plurality of antennas at only one of the transmitter and the receiver. Therefore, transmission rate and frequency efficiency are remarkably increased. Given a maximum transmission rate $R_o$ that may be achieved in case of a single antenna, the increase of channel transmission capacity may increase the transmission rate, in theory, to the product of $R_o$ and $R_i$ in case of multiple antennas. $R_i$ is a transmission rate increase rate.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards for 3rd Generation (3G) mobile communications, future-generation Wireless Local Area Network (WLAN), etc.

Concerning the research trend of MIMO, active studies are underway in many respects of MIMO, inclusive of studies of information theories related to calculation of multi-antenna communication capacity in diverse channel environments and multiple access environments, studies of measuring MIMO radio channels and MIMO modeling, studies of time-space signal processing techniques to increase transmission reliability and transmission rate, etc.

To describe a communication scheme in a MIMO system in detail, the following mathematical model may be used. It is assumed that there are $N_T$ Tx antennas and $N_R$ Rx antennas as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmit power may be applied to each piece of transmission information $s_1, s_2, \ldots, s_{N_T}$. Let the transmit power levels of the transmission information be denoted by $P_1, P_2, \ldots, P_{N_T}$, respectively. Then the power-controlled transmission information $\hat{S}$ may be given as [Equation 3].

$$\hat{S} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

$\hat{S}$ may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, actual $N_T$ transmitted signals $x_1, x_2, \ldots, x_{N_T}$ may be configured by applying a weight matrix W to the power-controlled information vector $\hat{S}$. The weight matrix W functions to appropriately distribute the transmission information to the Tx antennas according to transmission channel statuses, etc. These transmitted signals $x_1, x_2, \ldots, x_{N_T}$ are represented as a vector X, which may be determined as $$x = \begin{bmatrix} x_1 \\ x_2 \\ \vdots \\ x_i \\ \vdots \\ x_{N_T} \end{bmatrix}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

[Equation 5]

$W_{ij}$ denotes a weight for a $j^{th}$ piece of information transmitted through an $i^{th}$ Tx antenna. W is also referred to as a precoding matrix.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and a matrix by grouping them. The vector representation of channels may be carried out in the following manner.

FIG. 8 illustrates channels from $N_T$ Tx antennas to an $i^{th}$ Rx antenna.

Referring to FIG. 8, the channels from the $N_T$ Tx antennas to the $i^{th}$ Rx antenna may be expressed as [Equation 7].

$$h_i^T = [h_{i1}, h_{i2}, \ldots, h_{iN_T}] \quad \text{[Equation 7]}$$

Also, all channels from $N_T$ Tx antennas to $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the numbers of rows and columns of the channel matrix H representing a channel status are determined according to the number of Tx antennas and the number of Rx antennas, respectively. That is, the number of rows of the channel matrix H is equal to that of Tx antennas, $N_T$ and the number of columns of the channel matrix H is equal to that of Rx antennas, $N_R$. Thus the channel matrix H may be expressed as an $N_R \times N_T$ matrix. In general, the rank of a matrix is determined to be the smaller between the number of independent rows and the number of independent columns in the matrix. Accordingly, the rank of the matrix is not larger than the number of rows or columns. For example, the rank of the channel matrix H, rank(H) is limited as follows.

$$\text{rank}(H) \leq \min(N_T, N_R) \quad \text{[Equation 11]}$$

Reference Signals (RSs)

In a mobile communication system, a packet is transmitted on a radio channel. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. This signal is called a pilot signal or an RS.

According to the purposes that they serve, RSs are categorized into four types as listed in Table 1, Channel Quality Indicator-Common Reference Signal (CQI-CRS), Demodulation-Common Reference Signal (DM-CRS), Non-precoded Demodulation-Dedicated Reference Signal (NDM-DRS), and Precoded Demodulation-Dedicated Reference Signal (PDM-DRS).

TABLE 1

| RS Types | Notes |
| --- | --- |
| CQI-CRS | A common reference signal used for channel measurement. The UE determines a CQI, a Precoding Matrix Indicator (PMI), and a Rank Indicator (RI) based on CQI-CRSs. Thus, preferably, CQI-CRSs are uniformly distributed across a total frequency band. |
| DM-CRS | Although a DM-CRS is a common reference signal used for demodulation, it can be also used for channel measurement. Because a plurality of UEs use DM-CRSs for channel measurement, a precoding scheme for a specific UE cannot be applied to the DM-CRSs. Thus, when a transmitter precodes a Physical Downlink Shared CHannel (PDSCH), it needs to signal a used codebook on a Physical Downlink Control CHannel (PDCCH) to a receiver. |
| NDM-DRS | A non-precoded dedicated reference signal used for demodulation. |
| PDM-DRS | A precoded dedicated reference signal used for modulation. The same precoding scheme is applied to the PDM-DRS and the PDSCH. Thus there is no need for signaling a used codebook on the PDCCH. |

In case of data transmission and reception through multiple antennas, knowledge of channel states between Tx antennas and Rx antennas is required for successful signal reception. Accordingly, an RS should exist for each Tx antenna.

FIG. 9 illustrates a downlink RS allocation structure in case of a normal Cyclic Prefix (CP) in a 3GPP LTE system, and FIG. 10 illustrates a downlink RS allocation structure in case of an extended CP in the 3GPP LTE system. The downlink RS allocation structures illustrated in FIGS. 9 and 10 are for the current 3GPP LTE system.

Referring to FIGS. 9 and 10, the horizontal axis represents time and the vertical axis represents frequency in an RB. One subframe includes two slots. Each slot has seven OFDM symbols when the normal CP is used as illustrated in FIG. 9, whereas each slot includes six OFDM symbols when the extended CP is used as illustrated in FIG. 10. The extended CP is used generally under a long-delay environment. The RS allocation structures illustrated in FIGS. 9 and 10 are designed for four Tx antennas in a BS. Reference characters 0, 1, 2 and 3 denote CRSs for first to fourth antenna ports, antenna port 0 to antenna port 3, respectively, and reference character D denote DRSs.

As noted from FIGS. 9 and 10, in order to distinguish different antennas of a cell from one another, if an antenna port transmits an RS at an RE, the other antenna ports transmit no signals at the RE. Because channel estimation is performed using RSs, this scheme minimizes interference between antenna ports. When cell-specific RSs are used, the subcarrier spacing between RSs in a symbol is 6 and thus a cell-specific frequency shift value may range from 0 to 5. To avoid the same RS positions between cells, each cell determines RS positions using its cell-specific frequency shift value, with the aim to improve channel estimation performance by randomization of interference caused by RSs transmitted from other cells.

In the RS allocation structures illustrated in FIGS. 9 and 10, RSs are mapped to RBs according to the following rules described as [Equation 12] to [Equation 15]. Specifically, [Equation 12] and [Equation 13] describe the rule of mapping CRSs to RBs, and [Equation 14] and [Equation 15] describe the rule of mapping DRSs to RBs.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6 \quad \text{[Equation 13]}$$

normal CP  [Equation 14]

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

extended CP $$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3 \quad \text{[Equation 15]}$$

where $v_{shift}$ denotes a frequency shift value, k denotes a subcarrier index, p denotes an antenna port index, $N_{RB}^{DL}$ denotes the number of allocated downlink RBs, $n_s$ denotes a slot index, and $N_{ID}^{cell}$ denotes a cell ID.

According to [Equation 13] and [Equation 15], RSs of a cell may be shifted along the frequency axis by a frequency shift value $v_{shift}$ specific to the cell.

CoMP System

It is known that Inter-Cell Interference (ICI) generally degrades the performance of a UE at a cell edge. To minimize the performance degradation, a simple ICI mitigation technique is used, such as UE-specific Fractional Frequency Reuse (FFR) in LTE. However, an LTE-Advanced (LTE-A) system considers a technique for improving the performance of UEs at a cell edge by controlling ICI with coordination among a plurality of BSs. A system that supports one UE in coordination of a plurality of cells is called a Coordinated Multi-Point (CoMP) system in the standardization phase of LTE-A. The CoMP is characterized in that two or more BSs or cells coordinate with one another to improve the communication performance between a BS (cell or sector) and a UE in a shadowing area.

The CoMP system may increase the throughput of a UE at a cell edge by advanced MIMO transmission in a multi-cell environment. The CoMP system offers the benefits of ICI mitigation in the multi-cell environment and joint data support of multi-cell BSs for a UE. In addition, system performance may be improved since the BSs support one or more UEs (e.g. MS 1 to MS K) in the same radio frequency resources. The BSs may also operate in Space Division Multiple Access (SDMA) based on channel information between the UE and the BSs.

Depending on sharing of data and channel information among cells participating in a CoMP operation (hereinbelow, referred to as CoMP cells), different CoMP schemes are available.

Scheme 1. Both channel information and data are shared among the CoMP cells.

Scheme 2. Only channel information is shared among the CoMP cells.

Scheme 3. Only data is shared among the CoMP cells.

Scheme 4. Neither data nor channel information is shared among the CoMP cells.

Scheme 1 may improve the performance of a UE at a cell edge significantly, as data and channel information are shared among a serving cell and neighbor cells. However, UEs of the CoMP cells should feed back too a large amount of information, which makes it difficult to implement Scheme 1 in a real system. Moreover, the sharing of channel information among the neighbor cells may lead to a long delay.

In Scheme 2, the serving cell receives feedback channel information from UEs at cell edges in neighbor cells and mitigates ICI in a closed loop. While this scheme is considered as offering a gain with a minimal backhaul overhead, the feedback overhead of the UEs may impose a constraint on the system.

Scheme 3 may achieve a gain through open-loop transmission, minimizing system complexity.

Since any particular information for ICI mitigation is not shared among the serving cell and the neighbor cells, Scheme 4 enables simple ICI mitigation and is expected to give a marginal gain to the current LTE system.

Physical Downlink Control Channel (PDCCH)

The PDCCH carries control information about downlink data or uplink data. A UE determines whether there is downlink data directed to the UE or whether the UE is allowed to transmit uplink data, by monitoring the PDCCH. In general, the PDCCH is transmitted in every subframe and the UE determines whether the PDCCH is for the UE by running a random function using its unique ID.

Information transmitted on the PDCCH is divided into control information about downlink data and control information about uplink data. The control information about downlink data includes resource allocation information, modulation and coding information, HARQ process information, a New data Indicator (NDI), Redundancy Version (RV) information, power control information, and additionally, precoding information when MIMO is supported. Different control information about downlink data may be defined according to an operation mode.

The control information about uplink data includes resource allocation information, demodulation-RS resource information, CQI transmission request information, and additionally, precoding information when MIMO is supported.

The LTE-A standardization working body is considering various techniques for further improving the performance of a UE at a cell edge by CoMP-based ICI mitigation. Among them, a joint processing/transmission scheme transmits one or more data streams from a plurality of cells to one UE, sharing one Physical Resource Block (PRB) among the cells. The CoMP cells have their cell-specific frequency shift values for CRSs and DRSs and different numbers of antennas. This means that the CoMP cells have different RS allocation patterns. As a consequence, REs each carrying both data and an RS exist in a PRB allocated to the UE. If CRSs and DRSs reside together in a symbol, it may occur that CRSs overlap with DRSs according to the frequency shift values $v_{shift}$ of the cells. Consequently, system performance is degraded.

DISCLOSURE

Technical Problem

An object of the present invention devised to solve the problem provides a method for transmitting RSs with minimum Inter-Cell Interference (ICI) from a plurality of cells participating in a Coordinated Multi-Point (CoMP) operation.

Technical Solution

The object of the present invention can be achieved by providing, in a system having a plurality of cells participating in a Coordinated Multi-Point (CoMP) operation, a method for transmitting Reference Signals (RSs) to User Equipment (UE), the method including generating, by Base Station (BS) included in each of the plurality of cells, a subframe including RSs for a UE located in the each of the plurality of cells; and transmitting the generated subframe to the UE by the BS. The RSs include RSs for channel measurement, and RSs for data demodulation, the plurality of cells are grouped according to frequency shift values applied to the RSs for channel measurement and RS allocation patterns are determined for two cells among the plurality of cells according to a predetermined rule.

The two cells may be included in two different groups and one of frequency shift values other than frequency shift values applied to the RSs for channel measurement of the two different groups is used as a frequency shift value applied to RSs for data demodulation of the two cells.

The two cells may be included in the same group and one of frequency shift values other than a frequency shift value applied to RSs for channel measurement of the group is used as a frequency shift value applied to the RSs for data demodulation of the two cells.

The system may support three frequency shift values applied to the RSs for channel measurement.

Information about the RS allocation patterns can be transmitted on a Physical Downlink Control CHannel (PDCCH) or by Radio Resource Control (RRC) signaling.

In another aspect of the present invention, provided herein is, in a system having a plurality of cells participating in a Coordinated Multi-Point (CoMP) operation, a method for transmitting Reference Signals (RSs) to User Equipment (UE) including generating, by Base Station (BS) included in each of the plurality of cells, a subframe including RSs for a UE located in each of the plurality of cells; and transmitting the generated subframe to the UE by the BS. Two of the plurality of cells are a first cell and a second cell, and if the first cell is a serving cell and the second cell is a non-serving cell, RSs for data demodulation of the first and second cells are shifted to be at the same positions in subframes of the first and second cells.

In another aspect of the present invention, provided herein is, in a system having a plurality of cells participating in a Coordinated Multi-Point (CoMP) operation, a method for transmitting Reference Signals (RSs) to User Equipment (UE) including generating, by Base Station (BS) included in each of the plurality of cells, a subframe including RSs for a UE located in the each of the plurality of cells; and transmitting the generated subframe to the UE by the BS. Each of two cells among the plurality of cells allocates one or more Resource Elements (REs), in a downlink subframe of the same time region, to RSs for channel measurement for a transmission antenna, and positions of the REs allocated to the RSs for channel measurement for transmission antenna are different between the two cells in the downlink subframes of the same time region.

The two cells may have different frequency shift values applied to the RSs for channel measurement for the transmission antenna.

One of two cells may not transmit data in the same positions as the REs allocated to the RSs for the channel measurement for the transmission antenna by the other cell, in the downlink subframe of the one cell.

The one of the two cells may not transmit the data by puncturing or rate matching.

In another aspect of the present invention, provided herein is, in a system having a plurality of cells participating in a Coordinated Multi-Point (CoMP) operation, a method for transmitting Reference Signals (RS) to User Equipment (UE) including generating, by Base Station (BS) included each of the plurality of cells, a subframe including RSs for a UE located in the each of the plurality of cells; and transmitting the generated subframe to the UE by the BS. The subframe are transmitted at every predetermined interval, and one of two cells among the plurality of cells allocates one or more Resource Elements (REs) to RSs for channel measurement for a transmission antenna in a subframe of the one cell, and the other cell does not transmit data at the same positions as the REs allocated to the RSs for channel measurement for the transmission antenna by the one cell, in a subframe of the other cell.

The other cell may not transmit the data by puncturing or rate matching.

In another aspect of the present invention, provided herein is, in a system having a plurality of cells participating in a Coordinated Multi-Point (CoMP) operation, a method for transmitting data to a User Equipment (UE) located in a serving cell by the serving cell including transmitting data transmission information to the UE; and transmitting a subframe including data and Reference Signals (RSs) to the UE. The data transmission information indicates that data is not transmitted to the UE at positions of Resource Elements (REs) available to Common RSs (CRSs) of a non-serving cell, in the subframe transmitted to the UE.

The data may not be transmitted at the positions by puncturing or rate matching.

Advantageous Effects

A plurality of cells participating in a CoMP operation can transmit RSs to a UE, minimizing ICI in the exemplary embodiments of the present invention.

DESCRIPTION OF DRAWINGS

The accompanying drawings, which are included to provide a further understanding of the invention, illustrate embodiments of the invention and together with the description serve to explain the principle of the invention.

In the drawings:

FIGS. 37 and 38 illustrate subframe structures according to exemplary embodiments of the present invention.

BEST MODE

Figure 1:
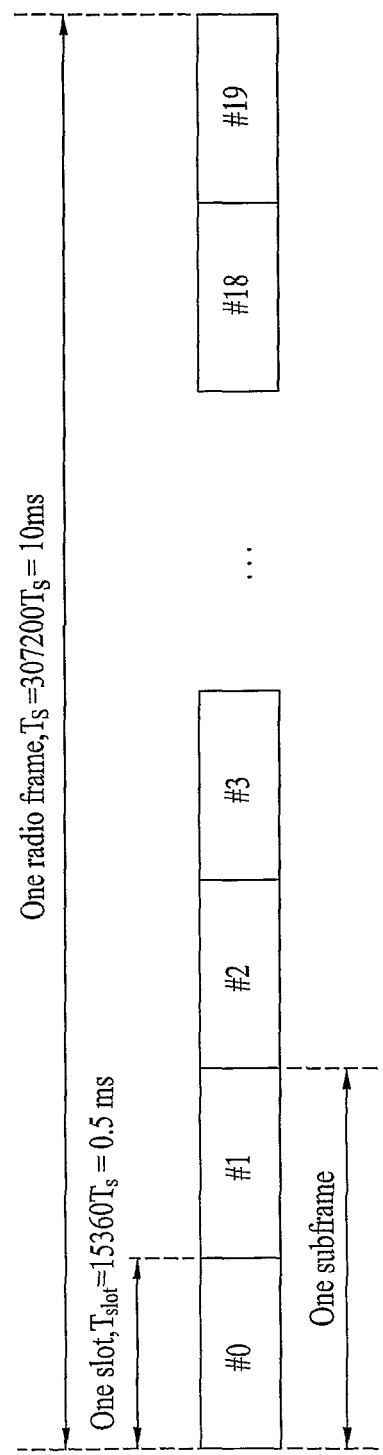
FIG. 1 illustrates a type-1 radio frame structure.
Figure 2:
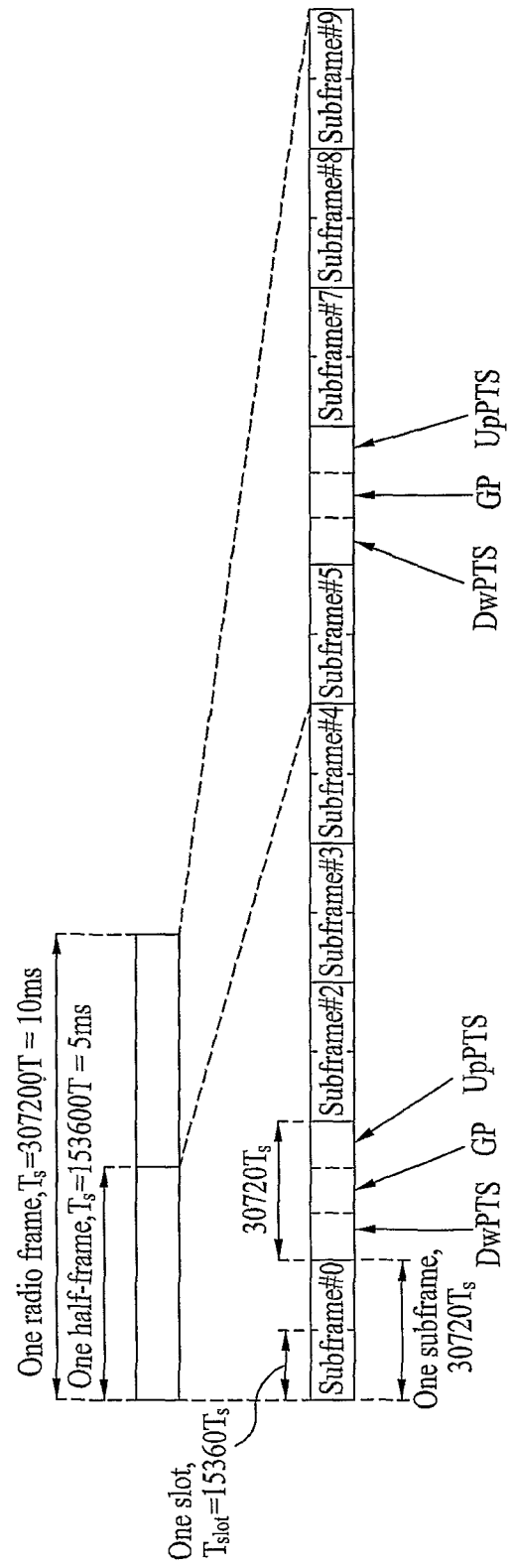
FIG. 2 illustrates a type-2 radio frame structure.
Figure 3:
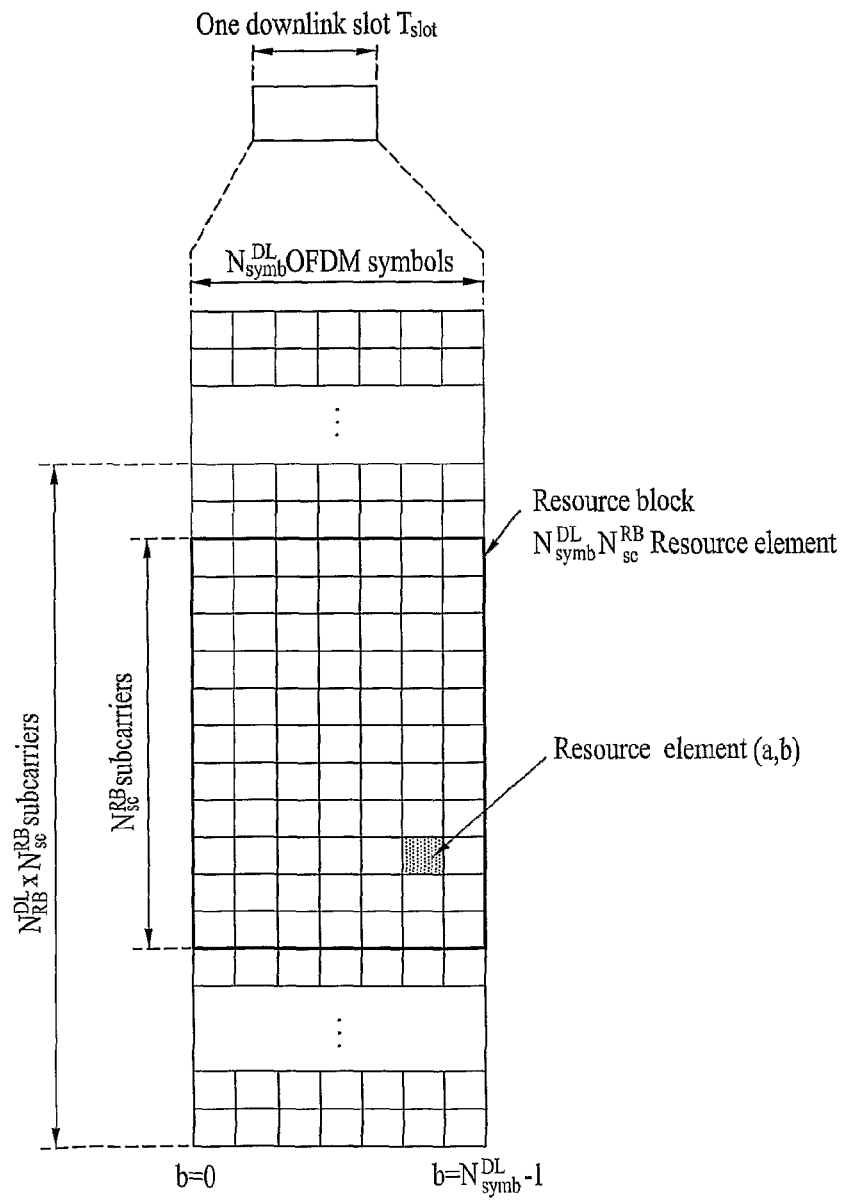
FIG. 3 illustrates a Long Term Evolution (LTE) downlink slot structure.
Figure 4:
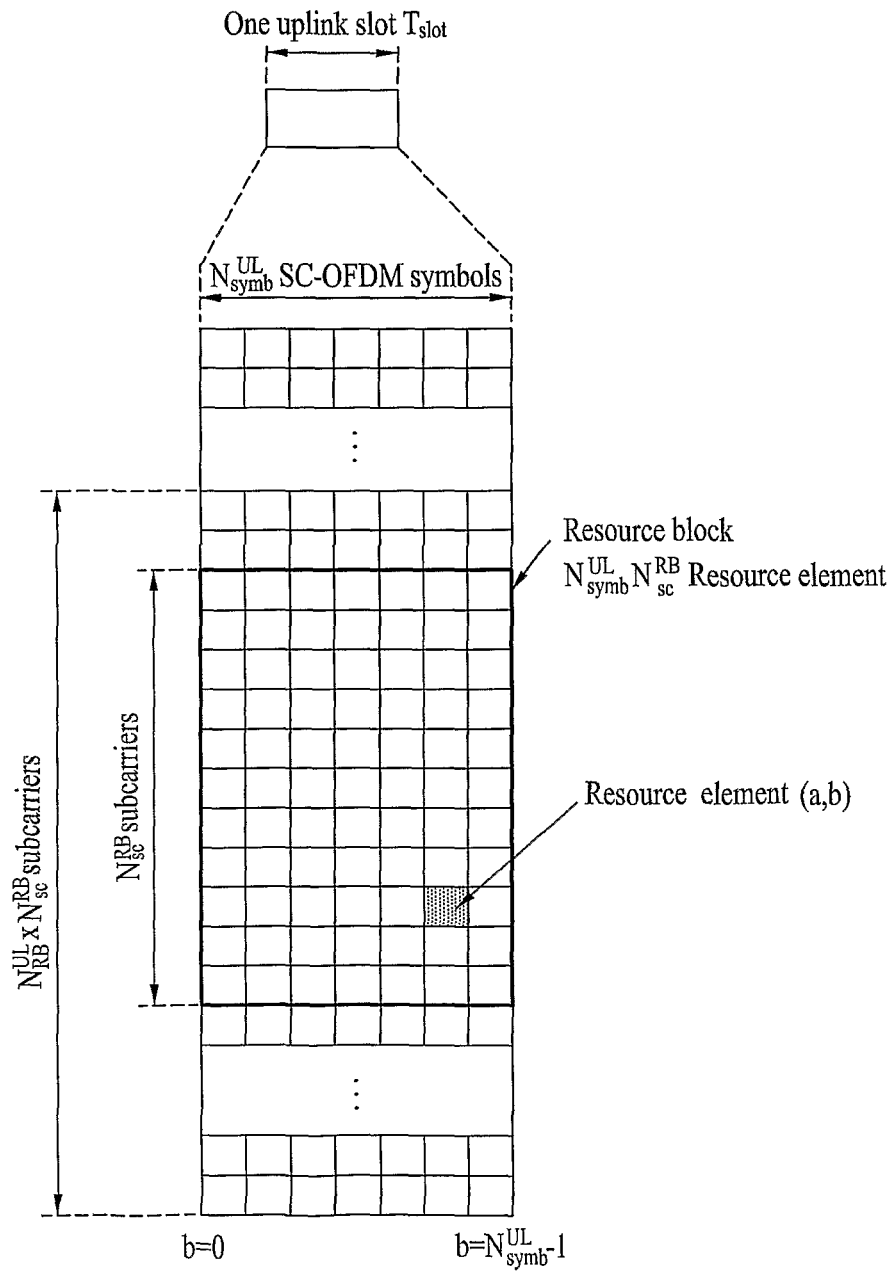
FIG. 4 illustrates an LTE uplink slot structure.
Figure 5:
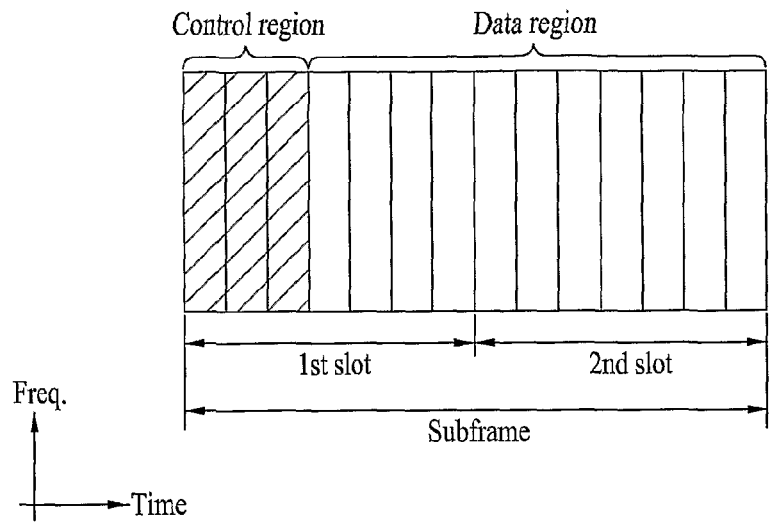
FIG. 5 illustrates an exemplary downlink subframe structure.
Figure 6:
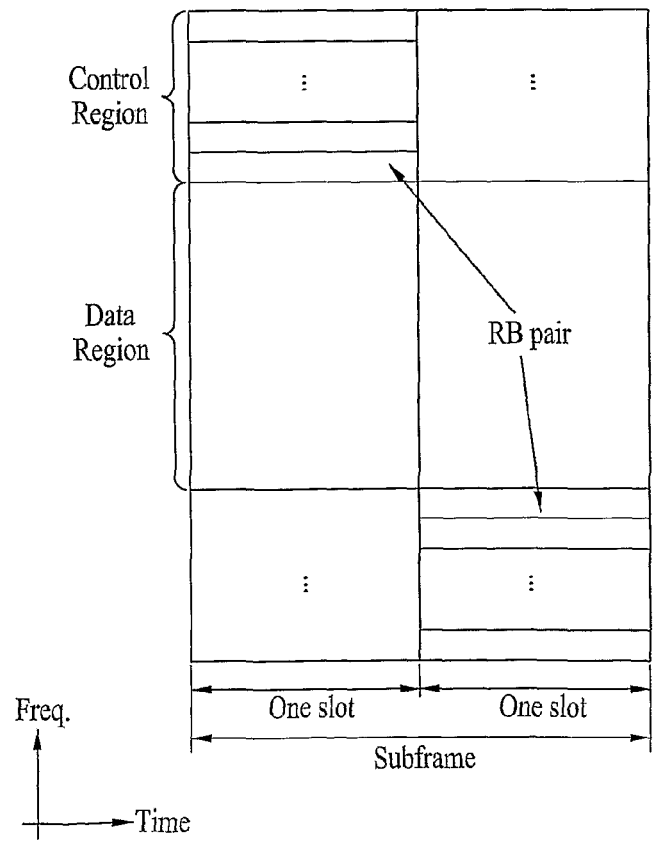
FIG. 6 illustrates an exemplary uplink subframe structure.
Figure 7:
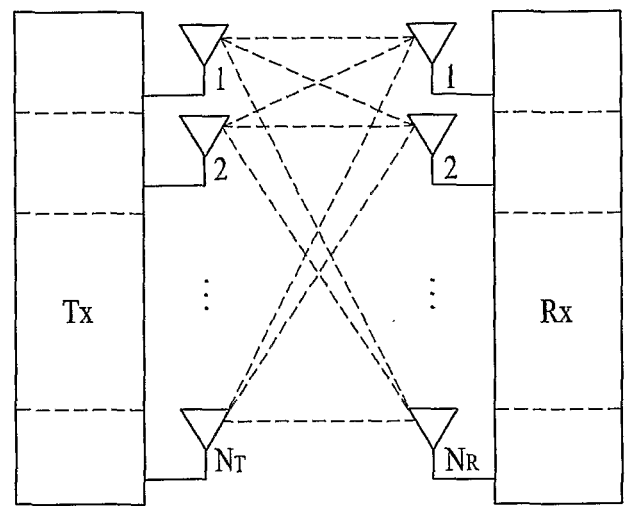
FIG. 7 illustrates the configuration of a typical MIMO communication system.
Figure 8:
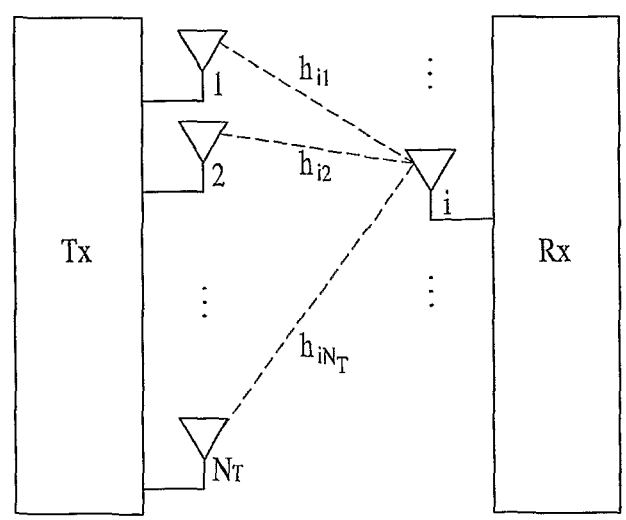
FIG. 8 illustrates channels from $N_T$ Transmission (Tx) antennas to an $i^{th}$ Reception (Rx) antenna.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following description includes specific details in order to provide a thorough understanding of the present invention. However, it will be apparent to those skilled in the art that the present invention may be practiced without such specific details. The same reference numbers will be used throughout this specification to refer to the same or like parts.

Techniques, apparatus, and system as set forth herein are applicable to a wide range of radio access technologies such as Code Division Multiple Access (CDMA), Frequency Division Multiple Access (FDMA), Orthogonal Frequency Division Multiple Access (OFDMA), Single Carrier-Frequency Division Multiple Access (SC-FDMA), etc. CDMA may be implemented into radio technologies like Universal Terrestrial Radio Access (UTRA) or CDMA2000. TDMA may be implemented into radio technologies including Global System for Mobile communications (GSM), Global Packet Radio Service (GPRS), and Enhanced Data Rate for GSM Evolution (EDGE). OFDMA may be implemented into radio technologies such as Institute of Electrical and Electronics Engineers (IEEE) 802.11 (Wi-Fi), IEEE 802.16 (WiMAX), IEEE 802.20, and Evolved-UTRA or E-UTRA.

UTRA is part of Universal Mobile Telecommunication System (UMTS). 3$^{rd}$ Generation Partnership Project (3GPP) Long Term Evolution (LTE) is part of Evolved-UMTS or E-UMTS using E-UTRA. 3GPP LTE adopts OFDMA for the downlink and SC-FDMA for the uplink. LTE-Advanced (LTE-A) is an evolution of 3GPP LTE. While the present invention is described in the context of 3GPP LTE and LTE-A, it should be understood that the technical features of the present invention are not limited to 3GPP LTE and LTE-A.

There are largely two types of Reference Signals (RSs), Dedicated RS (DRS) and Common RS (CRS). DRSs are known to a particular User Equipment (UE), whereas CRSs are known to all UEs. In general, DRSs are used for data demodulation and CRSs are used for channel measurement. In the drawings, reference character D denotes DRSs and reference numerals 0, 1, 2 and 3 denote CRSs. In addition, channel measurement-RSs for antennas added to a system will be referred to as Channel State Information-RSs (CSI-RSs).

A plurality of cells may support one UE in cooperation in two methods. One is that a plurality of cells share a Radio Frequency (RF) carrier frequency in a CoMP operation, and the other is that a plurality of cells use different RF carrier frequencies in a CoMP operation.

In the former cooperation method, for example, two cells each having a single antenna transmit data by transmit diversity such as Space Time Block Coding (STBC) or Space Frequency Block Coding (SFBC), thus decreasing error rate. The latter cooperation method, for example, may be performed by allocating different frequency bands to a UE by different cells. In this manner, more data may be transmitted in the resulting wide frequency band.

Hereinbelow, a description will be made of methods for designing CRS and DRS allocation patterns or CSI-RS and DRS allocation patterns to minimize ICI, for cells sharing the same RF carrier frequency as in the above first cooperation method.

Embodiment 1

Case 1: Each CoMP cell has one Transmission (Tx) antenna.

Figure 9:
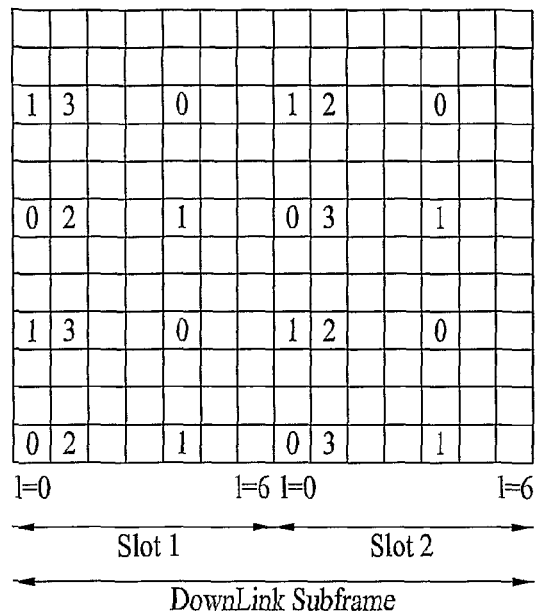
FIG. 9 illustrates a downlink RS allocation structure in case of a normal Cyclic Prefix (CP) in a $3^{rd}$ Generation Partnership Project Long Term Evolution (3GPP LTE) system.
Figure 10:
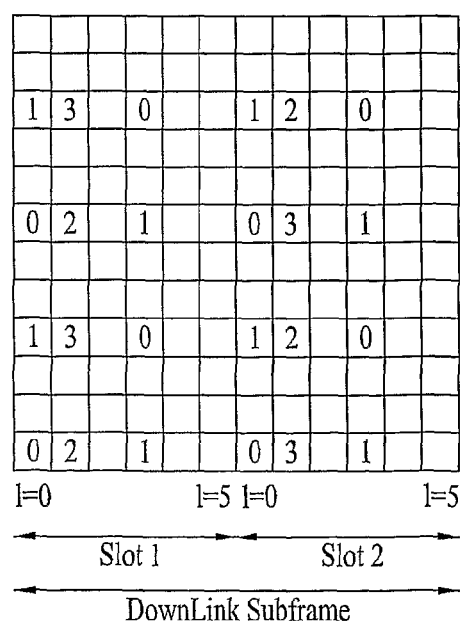
FIG. 10 illustrates a downlink RS allocation structure in case of an extended CP in the 3GPP LTE system.

FIG. 9 illustrates a CRS allocation structure in case of a normal CP in a 3GPP LTE system and FIG. 10 illustrates a CRS allocation structure in case of an extended CP in the 3GPP LTE system. In FIGS. 9 and 10, reference numerals 0, 1, 2 and 3 denote CRSs for antenna port 0 to antenna port 3.

If CoMP cells have a single Tx antenna, it is assumed that they transmit RSs 0 in FIGS. 9 and 10. Notably, the CoMP cells transmit their RSs, RSs 0 at different positions. If RSs from some CoMP cells are at the same position, they interfere with each other, thus making channel estimation difficult. On the other hand, if one CoMP cell transmits an RS at a certain position and another CoMP cell transmits data at the same position, the channel estimation capability of the RS is decreased because the data acts as interference to the RS. Accordingly, this exemplary embodiment of the present invention proposes that when one CoMP cell transmits an RS in certain time-frequency resources, the other CoMP cells transmit null data in the time-frequency resources in a CoMP operation. To reduce the effects of interference from a Resource Element (RE) carrying data from another cell, another cell may null the RE. The nulling amounts to transmission of no data in the RE by puncturing or rate matching. Then the cell may signal to a UE that it has nulled the RE that may carry an RS from another cell. In closed-loop spatial multiplexing, data is multiplied by a precoding matrix prior to transmission. Since the other CoMP cells do not transmit data at the position of an RS transmitted by one CoMP cell, this results in the same effect that a single cell multiplies data by a precoding matrix, for transmission.

Case 2: Each of CoMP Cells has two Tx antennas.

The CoMP cells transmit RSs 0 and RSs 1 in FIGS. 9 and 10. Notably, the RSs 0 and the RSs 1 are transmitted at different positions. That is, all RSs for four antenna ports are transmitted at different positions. As described with reference to Case 1, if one CoMP cell transmits an RS at a certain position, the other CoMP cells transmit null data at the same position. In closed-loop spatial multiplexing, data is multiplied by a precoding matrix prior to transmission. Since the other CoMP cells do not transmit data at the position of an RS transmitted by one CoMP cell, this results in the same effect that a single cell multiplies data by a precoding matrix, for transmission.

Case 3: One cell transmits an RS at a position and another cell transmits data at the same position.

If different cells are allowed to transmit an RS and data respectively at the same position, this may be done to increase data rate at the expense of performance degradation of RS-based channel estimation.

In the case where each of CoMP cells has a single Tx antenna and a CoMP cell is allowed to transmit data in REs occupied by RSs transmitted from another cell, this implies that precoding is not applied to time-space resources from the perspective of spatial multiplexing using a precoding matrix. If RSs common to all users are multiplied by a specific precoding matrix, other users may not use the RSs. For example, if two cells are participating in a CoMP operation and a precoding matrix of rank 1

$$\begin{bmatrix} 1 \\ j \end{bmatrix}$$

is used, $$\begin{bmatrix} 1 \\ j \end{bmatrix} s_1 = \begin{bmatrix} s_1 \\ js_1 \end{bmatrix}$$

is transmitted in time-space resources without RSs, whereas $$\begin{bmatrix} 1 \\ 0 \end{bmatrix} s_1 + \begin{bmatrix} 0 \\ RS_2 \end{bmatrix} = \begin{bmatrix} s_1 \\ RS_2 \end{bmatrix}$$

is transmitted in time-space resources carrying an RS from a cell. $s_l$ denotes a data signal and $RS_2$ denotes an RS.

In the case where each of CoMP cells has two Tx antennas, they transmits RSs 0 and RSs 1 at different positions, as described with reference to Case 1. A cell transmits no signal through an antenna port at an RE where it transmits an RS through another antenna port. However, another cell transmits data at the RE irrespective of the RS transmission of the cell. For instance, if two cells are participating in a CoMP operation and a precoding matrix of rank 1

$$\frac{1}{2}\begin{bmatrix} 1 \\ j \\ -1 \\ -j \end{bmatrix}$$

is used, a signal $$\frac{1}{2}\begin{bmatrix} 1 \\ j \\ -1 \\ -j \end{bmatrix} s_1 = \frac{1}{2}\begin{bmatrix} s_1 \\ js_1 \\ -s_1 \\ -js_1 \end{bmatrix}$$

is transmitted in time-space resources without an RS, while a signal $$\frac{1}{2}\begin{bmatrix} 1 \\ j \\ 0 \\ 0 \end{bmatrix} s_1 + \begin{bmatrix} 0 \\ 0 \\ 0 \\ RS_2 \end{bmatrix} = \frac{1}{2}\begin{bmatrix} s_1 \\ js_1 \\ 0 \\ 2RS_2 \end{bmatrix}$$

is transmitted in time-space resources carrying an RS from a cell. Here, $s_1$ denotes a data signal and $RS_2$ denotes an RS. That is, data is multiplied by a precoding matrix having 0 for a layer in which an RS is to be transmitted, and then transmitted along with the RS.

Embodiment 2

In another embodiment of the present invention, RS allocation patterns are designed based on the concept of nulling described before with reference to Case. 2 of Embodiment 1.

Figure 11:
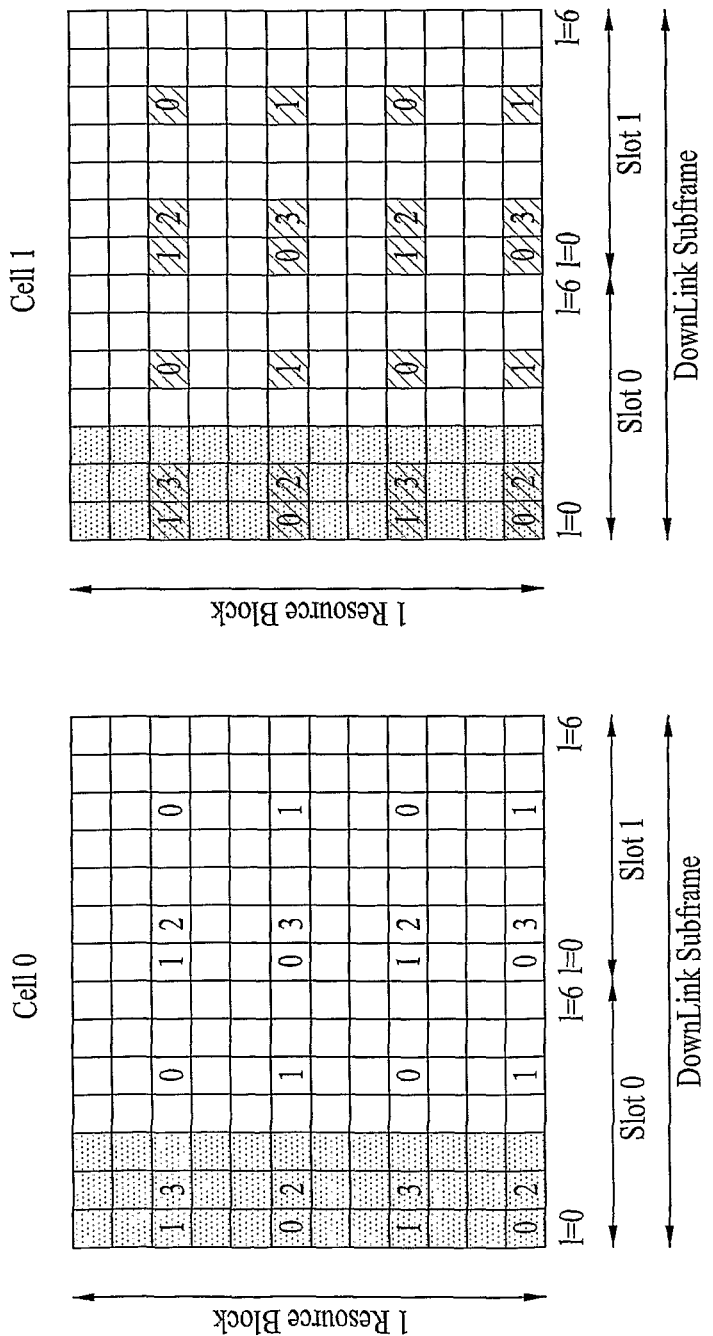
FIG. 11 illustrates Common Reference Signal (CRS) allocation patterns for two cells in the 3GPP LTE system.

FIG. 11 illustrates CRS allocation patterns for two cells in the 3GPP LTE system. Referring to FIG. 11, each subframe includes two consecutive slots. In case of a normal CP, a Physical Resource Block (PRB) has 14 consecutive OFDM symbols, whereas in case of an extended CP, a PRB has 12 consecutive OFDM symbols. To be more specific, when the normal CP is used, CRSs are transmitted in first, second and fifth symbols (l=0, 1 and 4) in each of two slots, that is, 6 symbols, and a synchronization signal is transmitted in the last two symbols (l=5 and 6) of the first slot, Slot 0 of each of every first and sixth subframes, subframe 0 and subframe 6. In every first subframe, subframe 0, first to fourth symbols (l=0, 1, 2, and 3) of a second slot, Slot 1 are used for a Physical Broadcast CHannel (PBCH).

Similarly when the extended CP is used, CRSs are transmitted in first, second and fourth symbols (l=0, 1 and 3) in each of two slots and a synchronization signal is transmitted in fifth and sixth symbols (l=6 and 7) of the first slot, Slot 0 of each of every first and sixth subframes, subframe 0 and subframe 5. In every first subframe, subframe 0, first to fourth symbols (l=0, 1, 2, and 3) of a second slot, Slot 1 are used for a PBCH.

For channel measurement for up to 8 Tx antennas, CRSs are supported for antenna port 0 to antenna port 3 and Channel State Information-RSs (CSI-RSs) are supported for additional antennas ports, that is, antenna port 4 to antenna port 7, or CSI-RSs are supported for antenna port 0 to antenna port 7. In this exemplary embodiment, available CSI-RS positions are proposed, which enable efficient resource allocation and offer a performance gain.

Method 1: One Symbol is Used for CSI-RSs Every P Subframes.

One symbol is available to carry CSI-RSs every P subframes. That is, one symbol may be used for channel measurement every P subframes. In case of the normal CP, for example, CSI-RSs may be transmitted in one of 7 symbols including unused for CRSs for antenna port 0 to antenna port 3, that is, fourth to seventh symbols (l=3, 5 and 6) of Slot 0 and third to seventh symbols (l=2, 3, 5 and 6) of Slot 1. More preferably, considering that the fourth and seventh symbols (l=3 and 6) of Slot 0 and the third and sixth symbols (l=2 and 5) of Slot 1 are used for demodulation of a Physical Downlink Shared CHannel (PDSCH) transmitted through a single antenna port, one of the three symbols being the sixth symbol (l=5) of Slot 0 and the fourth and seventh symbols (l=3 and 6) of Slot 1 may be selected for CSI-RSs.

Similarly in case of the extended CP, CSI-RSs may be transmitted in one of 5 symbols unused for CRSs for antenna port 0 to antenna port 3, that is, fifth and sixth symbols (l=4 and 5) of Slot 0 and third, fifth and sixth symbols (l=2, 4 and 5) of Slot 1. More preferably, considering that the fifth symbol (l=4) of Slot 0 and the second and fifth symbols (l=1 and 4) of Slot 1 are used for demodulation of a PDSCH transmitted through a single antenna port, one of the three symbols being the sixth symbol (l=5) of Slot 0 and the third and sixth symbols (l=2 and 5) of Slot 1 may be selected for CSI-RSs.

CSI-RSs are not limited to antenna port 4 to antenna port 7, and 12 REs forming one symbol may be wholly or partially used for the CSI-RSs. In both cases of the normal CP and the extended CP, however, the last symbol is the only symbol spared from other LTE functions such as carrying a PBCH, DRSs, CRSs for antenna port 0 to antenna port 3, and a synchronization signal. Therefore, it is preferable to deliver the CSI-RSs in the last symbol, thereby minimizing the effects of the CSI-RSs on the performance of Release-8 UEs.

Figure 12:
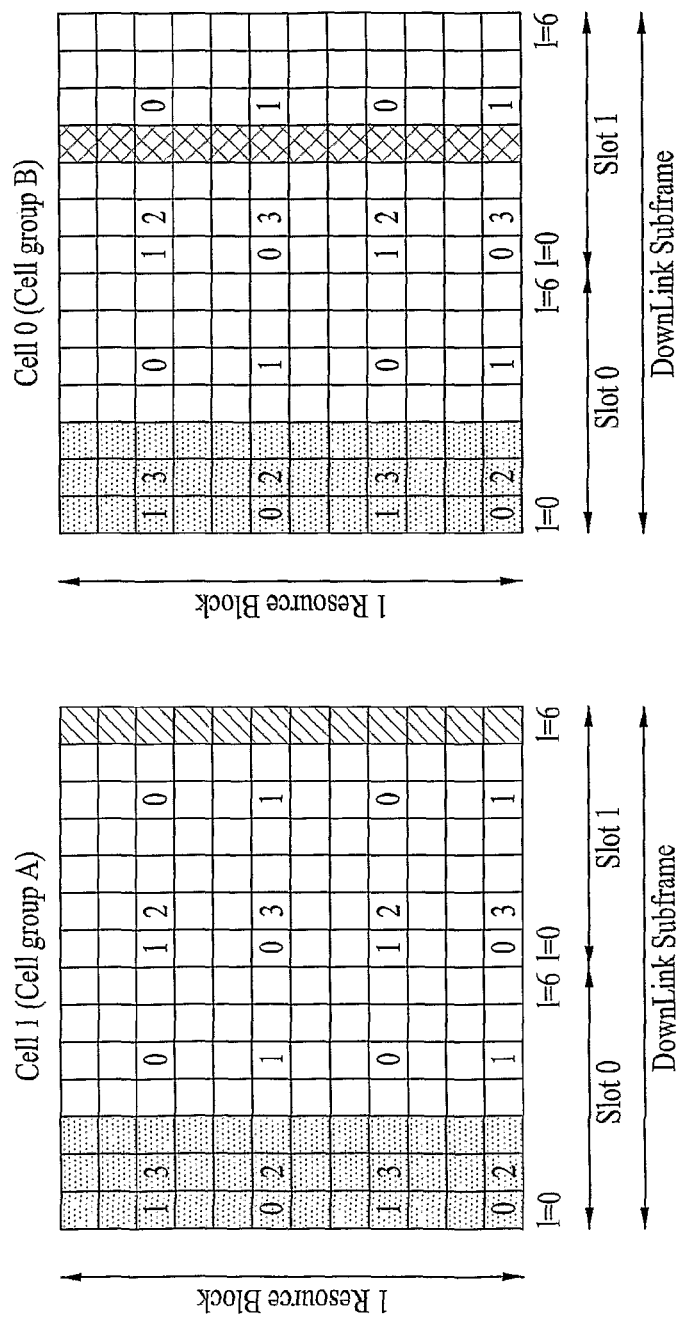
FIGS. 12 and 13 illustrate CRS allocation patterns for cells participating in a Coordinated Multi-Point (CoMP) operation according to an exemplary embodiment of the present invention.
Figure 13:
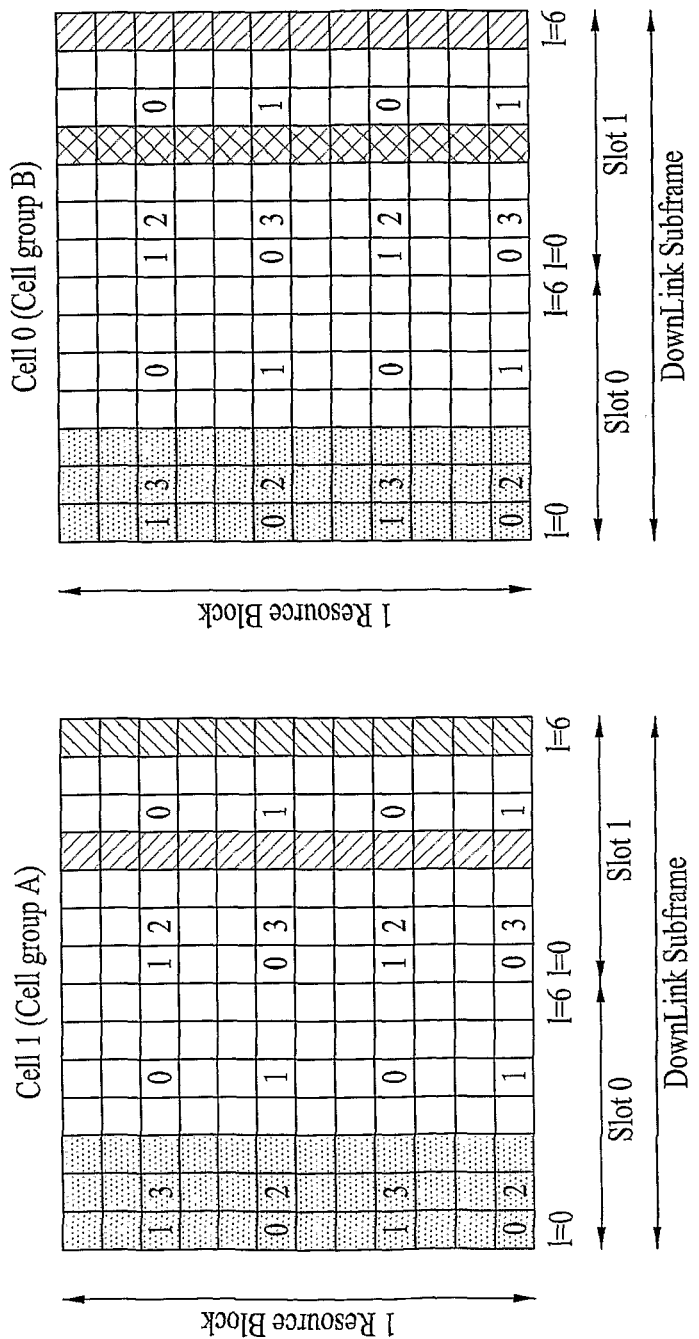

FIGS. 12 and 13 illustrate CRS allocation patterns for cells participating in a Coordinated Multi-Point (CoMP) operation according to an exemplary embodiment of the present invention. If a CRS allocation pattern for antenna 0 to antenna 3 is reused for CoMP channel measurement, CRSs from different CoMP cells may collide in some REs. The collision means interfering between CRSs transmitted at the same RE position in a subframe from different CoMP cells. Then, two cells Cell 0 and Cell 1 may suffer from performance degradation due to their CRSs in the same REs.

To avoid CRS collision between cells, it is proposed as illustrated in FIG. 12 that each cell transmits CSI-RSs at cell-specific positions. The same thing may be applied to DRSs as well as CSI-RSs. In FIG. 12,  and  represent REs carrying CSI-RSs from Cell 0 and Cell 1, respectively. One of methods for allocating CSI-RSs to REs without inter-cell collision is to separate CSI-RSs from each other according to cells in the time domain. As illustrated in FIG. 12, for example, the seventh symbol (l=6) of Slot 1 is available for CSI-RS transmission of Cell 0, whereas the fourth symbol (l=3) of Slot 1 is available for CSI-RS transmission of Cell 1.

Although all CoMP cells cannot avoid CSI-RS collision, each cell may choose a CSI-RS allocation pattern that causes as minimal CSI-RS collision as possible. In this manner, efficient CSI-RS allocation patterns may be designed, which minimize system loss.

More preferably, despite the existence of CRSs for antenna port 0 to antenna port 3, CSI-RSs may be designed for antenna port 0 to antenna port 7, particularly for a CoMP operation. Since CoMP cells may be grouped according to their cell-specific values (e.g. cell-specific frequency shift values $v_{shift}$ by which RSs of each cell are shifted along the frequency axis so that RSs of the cells reside at different positions), each cell group such as Cell group A and Cell group B may have a different symbol for CSI-RSs, as illustrated in FIG. 12. It is possible to transmit CSI-RSs in every predetermined period P (i.e. a CSI-RS transmission period) depending on a channel environment or an RS overhead-related system requirement. A set of symbols carrying CSI-RSs may be different for each cell group and signaled to UEs. Also, the set of symbols carrying CSI-RSs may be associated with cell IDs, determined by a specific function. Therefore, a UE may identify the set of symbols carrying CSI-RSs by the cell IDs.

Meanwhile, if channel measurement is carried out using CSI-RSs transmitted in the patterns illustrated in FIG. 12, CSI-RSs of one cell in specific REs may be interfered by data of another cell in the specific REs. The interference from data from another cell may be reduced by nulling the data in the REs, as illustrated in FIG. 13. Nulling means transmission of no data in an RE by puncturing or rate matching. In FIG. 13, ⊠ represents nulled REs. Thus Cell 1 may null data in REs where Cell 0 transmits CSI-RSs and also Cell 0 may null data in REs where Cell 1 transmits CSI-RSs.

Method 2: Two Symbols are Used for CSI-RSs Every P Subframes.

If a single symbol is used for transmission of CSI-RSs as in Method 1, the symbol is too crowded with the CSI-RSs to carry data or DRSs. In this context, this exemplary embodiment proposes that two symbols are allocated to CSI-RSs. For example, as 4 or 6 REs are allocated to CSI-RSs in each symbol, CSI-RSs may be less dense than in Method 1.

In case of the normal CP, therefore, CSI-RSs may be delivered in two of 7 symbols including unused for CRSs for antenna port 0 to antenna port 3, that is, fourth to seventh symbols (l=3, 5 and 6) of Slot 0 and third to seventh symbols (l=2, 3, 5 and 6) of Slot 1. More preferably, considering that the fourth and seventh symbols (l=3 and 6) of Slot 0 and the third and sixth symbols (l=2 and 5) of Slot 1 are used for demodulation of a PDSCH transmitted through a single antenna port, two of the remaining three symbols being the sixth symbol (l=5) of Slot 0 and the fourth and seventh symbols (l=3 and 6) of Slot 1 may be selected for CSI-RSs.

Similarly in case of the extended CP, CSI-RSs may be transmitted in two of 5 symbols unused for CRSs for antenna port 0 to antenna port 3, that is, fifth and sixth symbols (l=4 and 5) of Slot 0 and third, fifth and sixth symbols (l=2, 4 and 5) of Slot 1. More preferably, considering that the fifth symbol (l=4) of Slot 0 and the second and fifth symbols (l=1 and 4) of Slot 1 are used for demodulation of a PDSCH transmitted through a single antenna port, two of the remaining three symbols being the sixth symbol (l=5) of Slot 0 and the third and sixth symbols (l=2 and 5) of Slot 1 may be selected for CSI-RSs. Alternatively or additionally, one symbol per slot may be used for CSI-RSs to cover a channel delay spread.

The use of two symbols for CSI-RSs in a CoMP operation is highly likely to result in simultaneous use of at least one same CSI-RS symbol between cells. Hence, cell-specific frequency shift values $v_{shift}$ or a similar factor may be taken into account in order to avoid CSI-RS collision.

Figure 14:
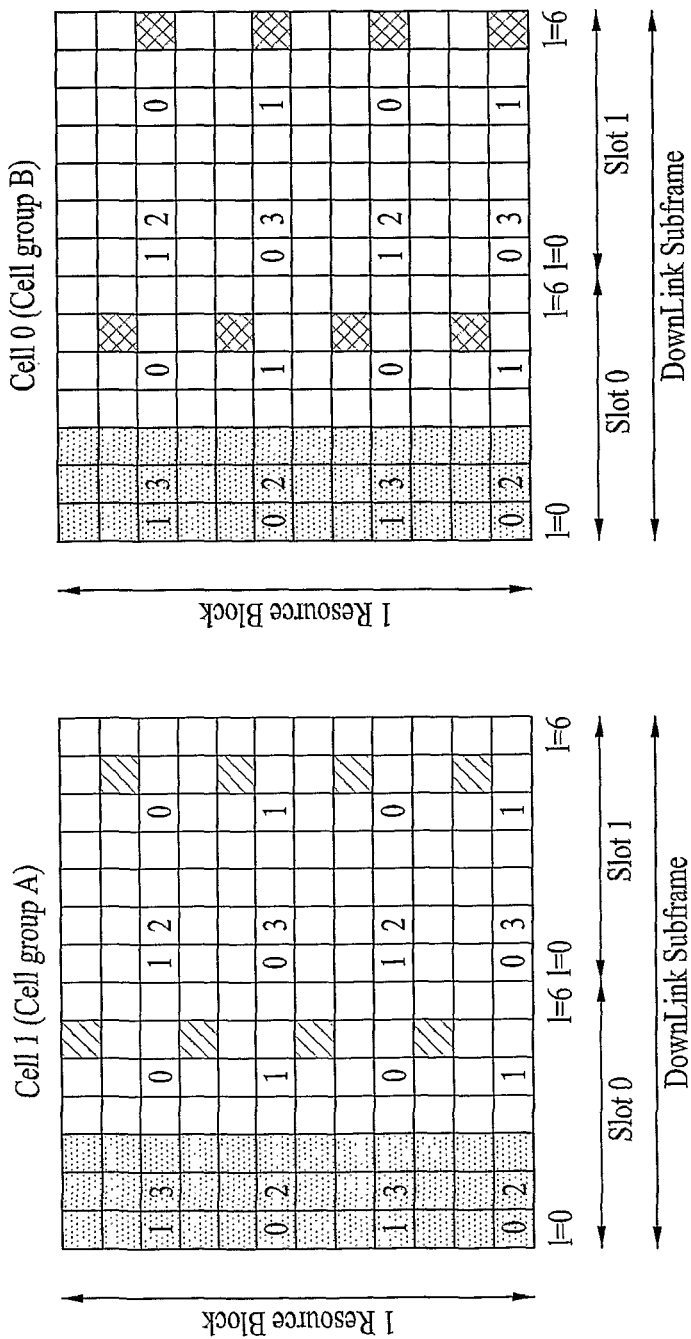
FIGS. 14 and 15 illustrate CRS allocation patterns for cells participating in a CoMP operation according to another exemplary embodiment of the present invention.
Figure 15:
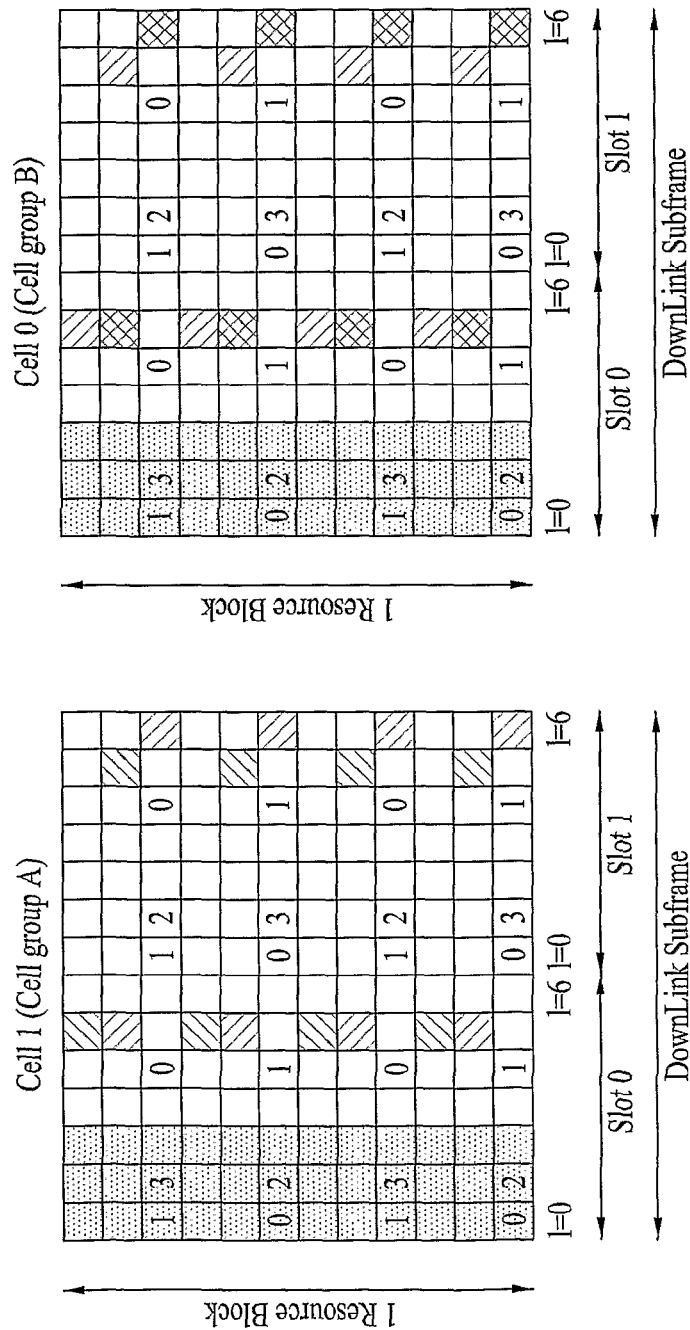

FIGS. 14 and 15 illustrate CRS allocation patterns for cells participating in a CoMP operation according to another exemplary embodiment of the present invention.

Referring to FIG. 14, for each cell or cell group, there is a probability of having one (l=5 in Slot 0) of two CSI-RS symbols overlapped with a CSI-RS symbol of its neighbor cell or cell group. To reduce interference from the neighbor cell or cell group, the cell-specific frequency shift value of the cell or cell group may be changed. As illustrated in FIG. 14, symbols carrying CSI-RSs have room for data or DRSs.

Meanwhile, if channel measurement is carried out using CSI-RSs transmitted in the patterns illustrated in FIG. 14, CSI-RSs transmitted in specific REs by one CoMP cell may be interfered by data transmitted in the specific REs by another CoMP cell. The interference from data from another CoMP cell may be reduced by nulling the data in the REs, as illustrated in FIG. 15. In FIG. 15, ⊠ represents nulled REs. Thus Cell 1 may null data in REs where Cell 0 transmits CSI-RSs and also Cell 0 may null data in REs where Cell 1 transmits CSI-RSs.

Method 3: CSI-RSs are Transmitted in the Same Symbols Carrying CRSs for Antenna Port 0 to Antenna Port 3 Every P Subframes.

Figure 16:
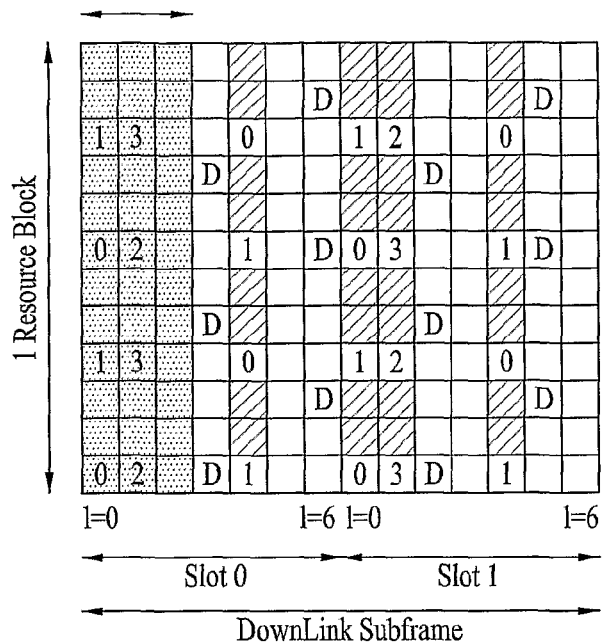
FIGS. 16 and 17 illustrate CRS allocation patterns for cells participating in a CoMP operation according to another exemplary embodiment of the present invention.
Figure 17:
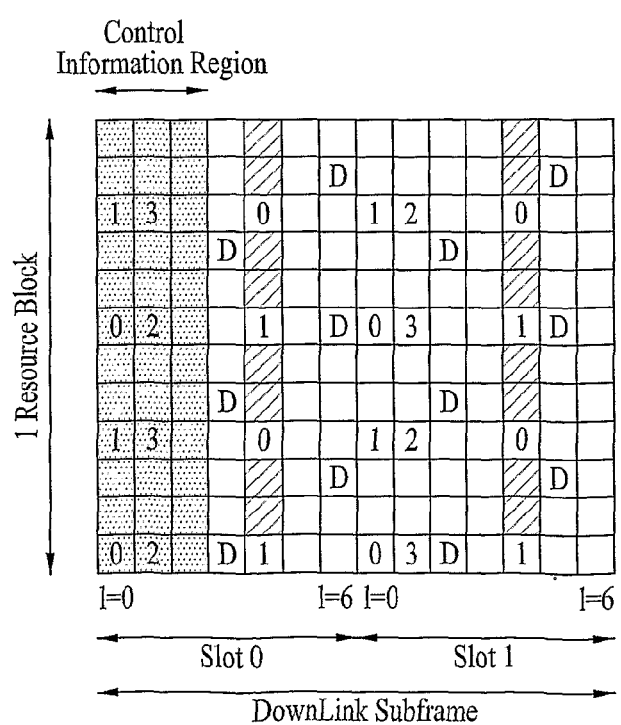

FIGS. 16 and 17 illustrate CRS allocation patterns for cells participating in a CoMP operation according to another exemplary embodiment of the present invention.

As demodulation-DRSs (DM-DRSs) are also transmitted in time-frequency resources, there is a limited number of REs available to CSI-RSs. Assuming that CSI-RSs do not coexist with DRSs in the same symbol and high power boosting is not required for RSs, additional CSI-RSs may be transmitted in OFDM symbols carrying CRSs.

Referring to FIGS. 16 and 17, up to four symbols except for a PDCCH region are available to the additional CSI-RSs, and the remaining eight REs of each of the available symbols may be wholly or partially used for CSI-RSs.

If the CSI-RSs are inserted only in OFDM symbols carrying CRSs, the CSI-RSs and the DRSs are positioned in different OFDM symbols. As a consequence, power boosting of the CSI-RSs for improved channel estimation does not affect the DRSs, thereby making it possible to design an efficient DRS allocation pattern.

Embodiment 3

Now a description will be made of CRS and DRS allocation patterns, when CoMP cells have the same number of Tx antennas or different numbers of Tx antennas. Embodiment 3 is about designing RS patterns based on the concept of nulling described before with reference to Case 2 of Embodiment 1.

Figure 18:
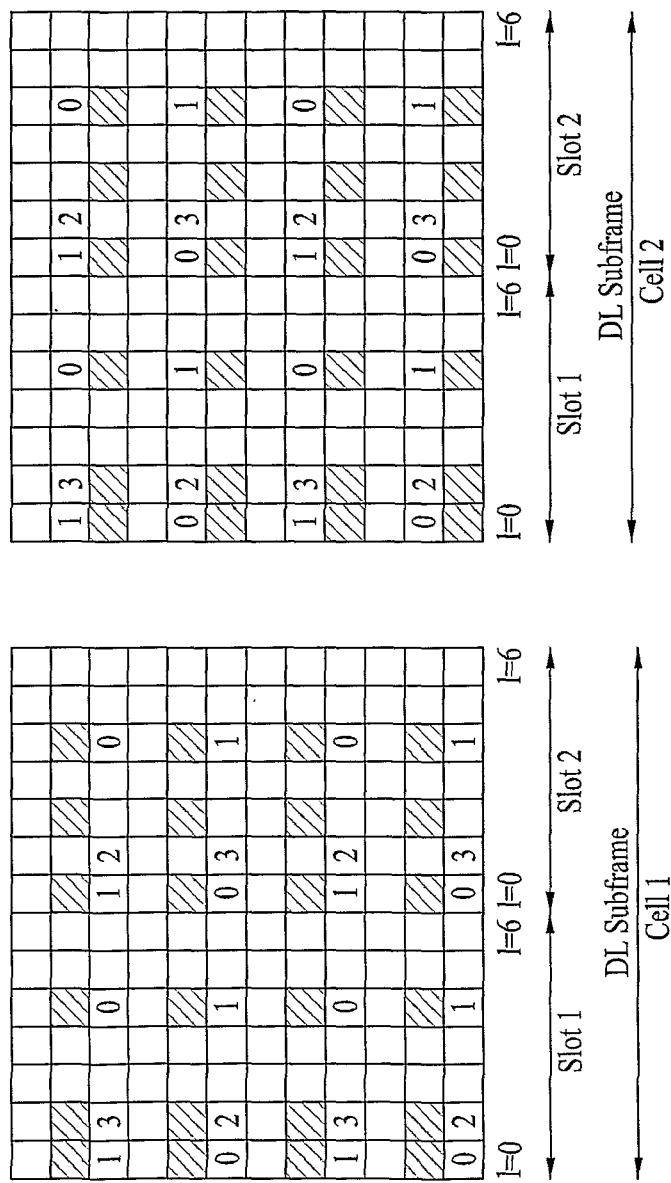
FIG. 18 illustrates subframe structures for two cells capable of participating in a CoMP operation, when the cells have different cell-specific frequency shift values but support the same number of antennas.

FIG. 18 illustrates subframe structures for two cells capable of participating in a CoMP operation, when the cells have different cell-specific frequency shift values but support the same number of antennas.

Referring to FIG. 18, reference numerals 0, 1, 2 and 3 denote CRSs for antenna port 0 to antenna port 3, respectively and ▨ represents nulled REs. The nulling may be realized in two methods. One of the nulling methods is that encoded data are first inserted in REs and then punctured prior to transmission, thus virtually transmitting no information in the REs, and the other nulling method is that data is rate-matched so that no data are inserted in REs.

In the LTE system, RSs are allocated to REs according to a cell-specific frequency shift value $v_{shift}$. On the assumption that a UE has knowledge of the cell IDs of CoMP cells, the UE may find out REs available to the CoMP cells and RS allocation patterns of the CoMP cells and accordingly perform channel measurement and demodulation. However, as two cells with different cell IDs can participate in a CoMP operation as illustrated in FIG. 18, CRSs may collide with data between the cells.

For instance, if one of two CoMP cells, Cell 1 is silenced, Cell 1 nulls data in REs carrying CRSs of Cell 2 in an RB allocated to Cell 2 because a UE should demodulate data transmitted by Cell 2. Even though Cell 1 is not silenced, Cell 1 cannot transmit data in REs that are not used by an anchor cell connected to the UE and carry CRSs of Cell 2 in an RE received by the UE. Silencing is a technique of transmitting only information and signals required for operating as a cell, not data in predetermined time-frequency areas by a certain CoMP cell among CoMP cells.

While the description made so far is based on the premise that CoMP cells basically have the same number of Tx antennas, a system where CoMP cells have different numbers of Tx antennas may be implemented under circumstances. For the convenience' sake of description, it is assumed that Cell 1 supports four Tx antennas and Cell 2 supports two Tx antennas.

Figure 19:
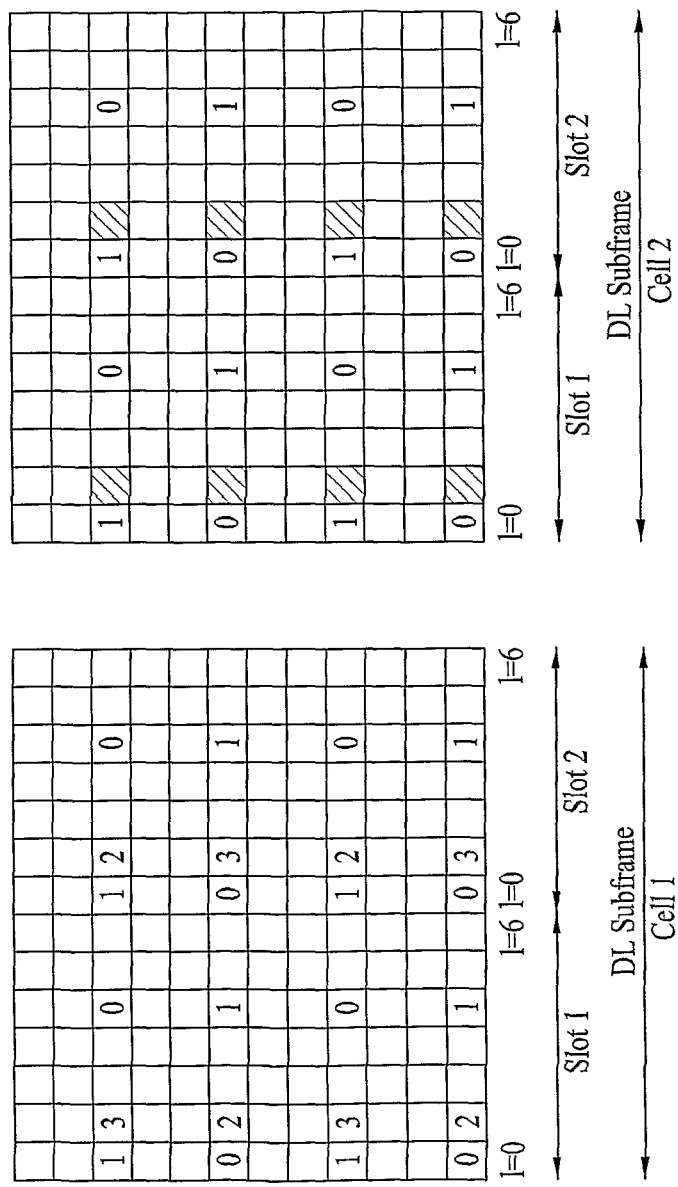
FIG. 19 illustrates subframe structures for two cells participating in a CoMP operation, when the cells have the same cell-specific frequency shift value, one of the cells supports four antennas, and the other cell supports two antennas.

FIG. 19 illustrates subframe structures for two cells Cell 1 and Cell 2 participating in a CoMP operation, when the cells have the same cell-specific frequency shift value $v_{shift}$, one of the cells, Cell 1 supports four antennas, and the other cell, Cell 2 supports two antennas. The number of transmitted RSs varies with the number of supported Tx antennas. Hence, RSs for antenna port 2 and antenna port 3 transmitted in certain REs from Cell 1 collide with data transmitted in the REs from Cell 2. Then Cell 2 should null the data in the REs to avoid the RS-data collision.

Figure 20:
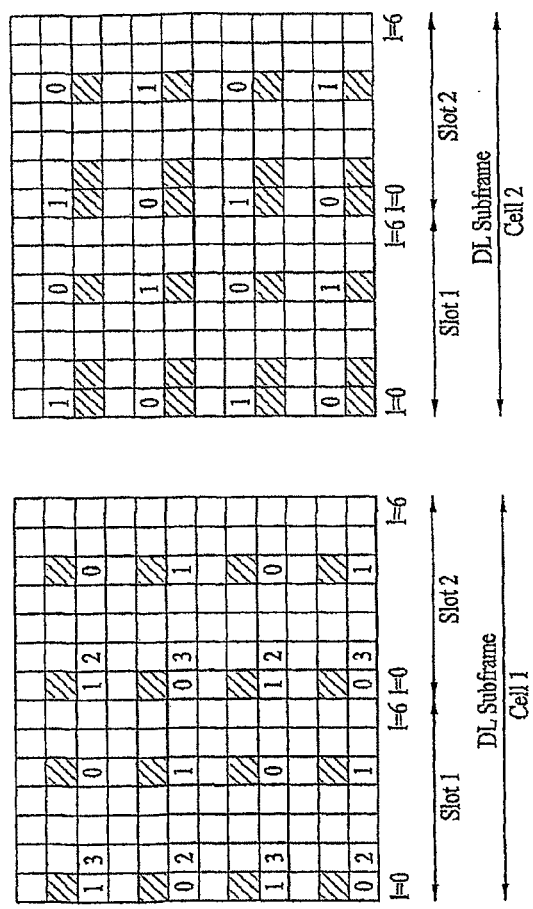
FIG. 20 illustrates subframe structures for two cells participating in a CoMP operation, when the cells have different cell-specific frequency shift values, one of the cells supports four antennas, and the other cell supports two antennas.

FIG. 20 illustrates subframe structures for two cells Cell 1 and Cell 2 participating in a CoMP operation, when the cells have different cell-specific frequency shift values $v_{shift}$, one of the cells, Cell 1 supports four antennas, and the other cell, Cell 2 supports two antennas. The number of transmitted RSs varies with the number of supported Tx antennas and cell-specific frequency shift values $v_{shift}$. Hence, RSs transmitted in certain REs from one cell collide with data transmitted in the REs from another cell. Then each of Cell 1 and Cell 2 should null data in REs carrying RSs of the other cell to avoid the RS-data collision.

When a cell in a set of cells capable of participating in a CoMP operation transmits CRSs in the same REs carrying data from another cell, the data may be nulled in the REs in the following methods.

A) If the cells capable of participating in the CoMP operation have different numbers of Tx antennas, a cell may null data in REs carrying CRSs from another cell, with respect to an anchor cell.

B) Even though a cell is designated as capable of participating in the CoMP operation according to a transmission scheme at the moment data can be transmitted in a CoMP scheme, the cell may not transmit data actually.

According to a CoMP transmission scheme, a CoMP cell may null REs which are supposed to be nulled by the anchor cell or may not null the REs by receiving additional signaling from an Evolved Node B (eNB) in the present invention.

In the case where a CoMP cell has to null data in REs carrying RSs from another CoMP cell, the data nulling may be indicated to the UE by signaling from a higher layer or by signaling on a PDCCH.

Figure 21:
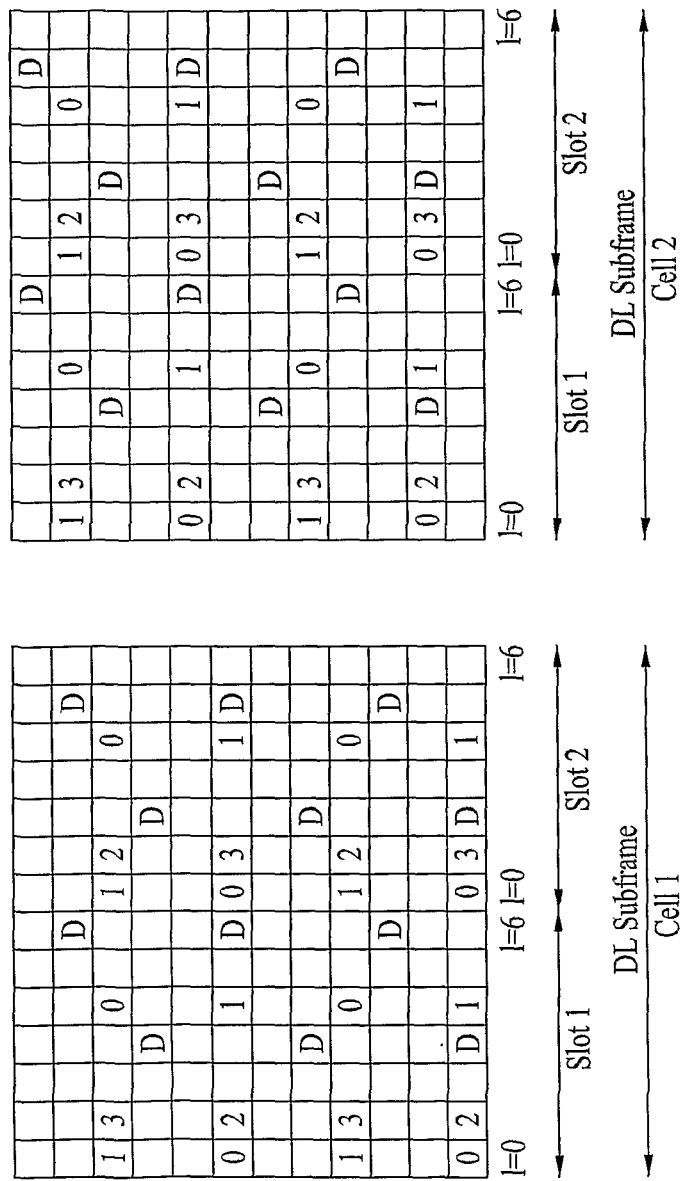
FIG. 21 illustrates CRS and Dedicated Reference Signal (DRS) allocation patterns for two cells in case of a normal CP, when the cells have different cell-specific frequency shift values according to an exemplary embodiment of the present invention.

FIG. 21 illustrates CRS and DRS allocation patterns for two cells, Cell 1 and Cell 2 in case of a normal CP, when the cells have different cell-specific frequency shift values according to an exemplary embodiment of the present invention. On the assumption that a UE has knowledge of the cell IDs of CoMP cells, the UE may find out REs available to the CoMP cells and RS allocation patterns of the CoMP cells and accordingly perform channel measurement and demodulation. More specifically, when two cells with different cell IDs participate in a CoMP operation, they have different cell-specific frequency shift values $v_{shift}$ according to [Equation 12] and [Equation 14] and thus different RS allocation patterns.

As noted from FIG. 21, in case of the normal CP, neither CRSs nor DRSs occupy the same REs between Cell 1 and Cell 2 in a PRB irrespective of the cell-specific frequency shift values $v_{shift}$ of the CRSs and DRSs.

Figure 22:
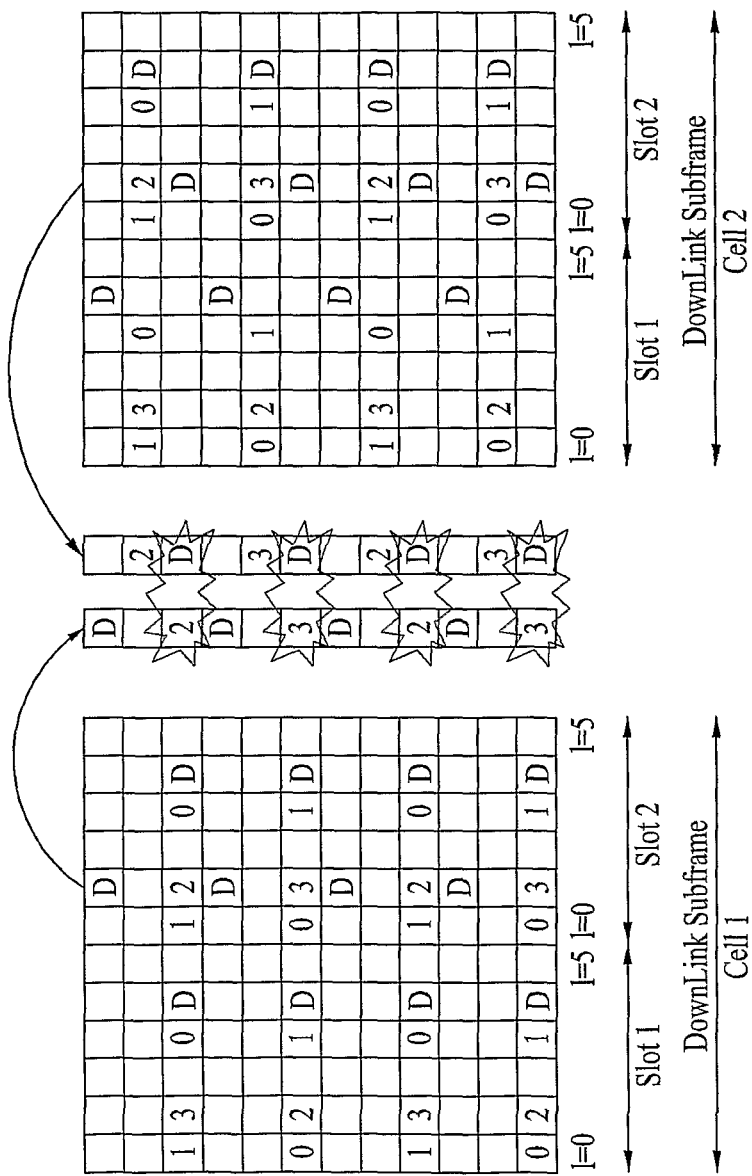
FIG. 22 illustrates CRS and DRS allocation patterns for two cells in case of an extended CP, when the cells have different cell-specific frequency shift values according to an exemplary embodiment of the present invention.

FIG. 22 illustrates CRS and DRS allocation patterns for two cells, Cell 1 and Cell 2 in case of an extended CP, when the cells have different cell-specific frequency shift values according to an exemplary embodiment of the present invention.

Referring to FIG. 22, CRSs and DRSs exist in the same symbol (l=1 in a second slot, Slot 2) in case of the extended CP. As a result, it may occur that CRSs may collide with DRSs between Cell 1 and Cell 2, thus interfering between them. Thus, system performance is degraded.

Basically, this problem can be overcame by puncturing either the CRSs or the DRSs. Puncturing the CRSs decreases the accuracy of channel measurement, whereas puncturing the DRSs decreases the accuracy of channel estimation.

Considering that channel estimation for demodulation is usually more significant than channel measurement, the CRSs may be punctured. Yet, the present invention proposes that a rule is set to avoid allocation of CRSs and DRSs to the same REs between different cells rather than either the CRSs or the DRSs are punctured.

As stated before, the cell-specific frequency shift values $v_{shift}$ of CRSs and DRSs are determined by [Equation 13], [Equation 14] and [Equation 15] in the LTE system. Thus to avoid collision between CRSs and DRSs of different cells, cells capable of participating in a CoMP operation needs to be grouped. Because the cell-specific frequency shift value $v_{shift}$ of DRSs is one of 0, 1 and 2 according to [Equation 15], entire CoMP cells may be grouped into three cell groups.

In this exemplary embodiment, cells are grouped into Group A, Group B and Group C according to their cell-specific frequency shift values $v_{shift}$ of CRSs, 0, 1 and 2. Yet, this specific number of groups is a mere exemplary application and thus many other numbers of groups may be produced according to values $v_{shift}$ in other systems.

Implementation of a CoMP operation with the above three groups may lead to collision between CRSs and DRSs of different CoMP cells. Therefore, it is proposed that cells from two of the three groups serve as CoMP cells. In this case, it is also proposed that DRSs of each of the two groups are allocated to REs based on a frequency shift value $v_{shift}$ corresponding to REs unused for CRSs (or CSI-RSs) in the two groups. The following examples are about configuring CoMP cells from two of the three groups.

Case 1: Cells from Group A and Group B Serve as CoMP Cells.

Figure 23:
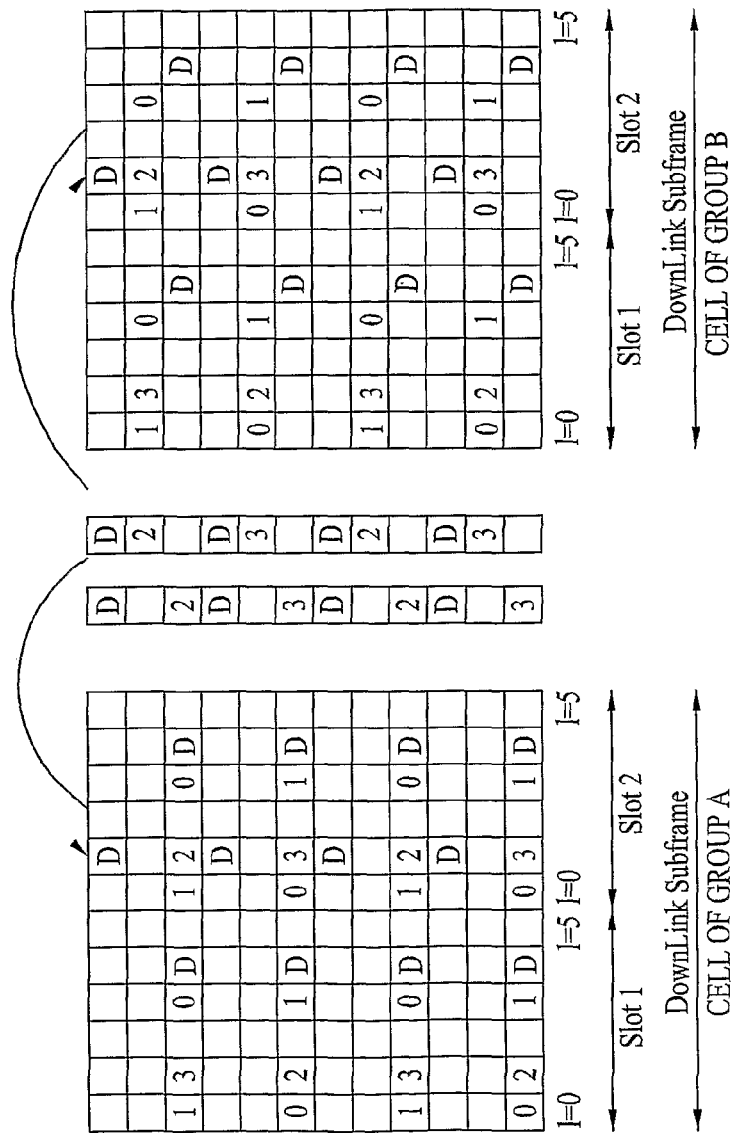
FIGS. 23, 24 and 25 illustrate CRS and DRS allocation patterns, when CoMP cells are from two groups Group A and Group B according to exemplary embodiments of the present invention.

FIG. 23 illustrates CRS and DRS allocation patterns, when CoMP cells are from two groups Group A and Group B according to an exemplary embodiment of the present invention.

CoMP cells from Group A and Group B have CRS frequency shift values $v_{shift}$ of 0 and 1, respectively. Thus CRSs of the CoMP cells are shifted along the frequency axis as illustrated in FIG. 23. One thing to note herein is that DRS frequency shift values of the CoMP cells should be whiff determined based on a frequency shift value corresponding to REs unused for the two groups in order to avoid collision between CRSs and DRSs. For example, based on DRS allocation patterns defined in the current LTE system, a DRS frequency shift value may be calculated by [Equation 16].

$$\text{DRS } v_{shift}=(\text{CRS } v_{shift} \text{ of Group } C+1)\% \text{ Number of Groups} \quad \text{[Equation 16]}$$

Case. 2: Cells from Group A and Group C Serve as CoMP Cells.

Figure 24:
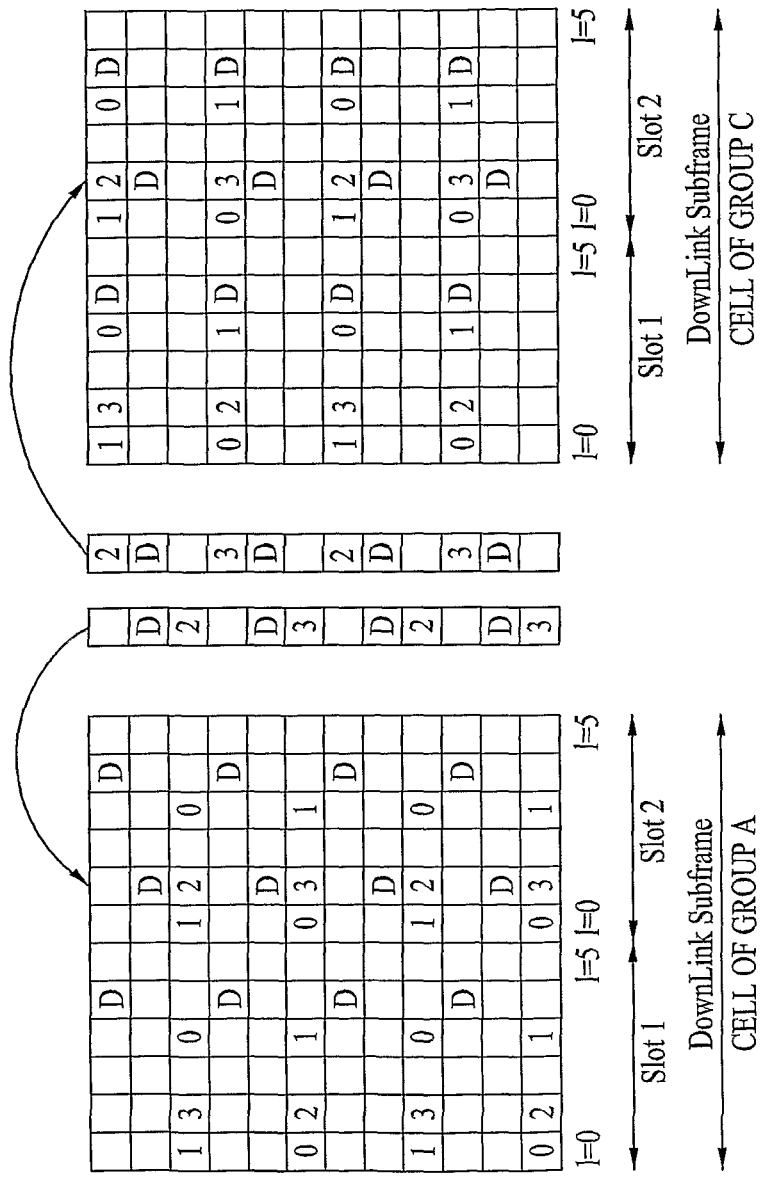

FIG. 24 illustrates CRS and DRS allocation patterns, when CoMP cells are from two groups Group A and Group C according to an exemplary embodiment of the present invention. CoMP cells from Group A and Group C have CRS frequency shift values $v_{shift}$ of 0 and 2, respectively. Thus CRSs of the CoMP cells are shifted along the frequency axis as illustrated in FIG. 24. In order to avoid collision between CRSs and DRSs, DRS frequency shift values of the CoMP cells should be determined based on a frequency shift value $v_{shift}$ corresponding to REs unused for the two groups. For example, based on the DRS allocation patterns defined in the current LTE system, a DRS frequency shift value $v_{shift}$ may be calculated by [Equation 17].

$$\text{DRS } v_{shift}=(\text{CRS } v_{shift} \text{ of Group } B+1)\% \text{ Number of Groups} \quad \text{[Equation 17]}$$

Case. 3: Cells from Group B and Group C Serve as CoMP Cells.

Figure 25:
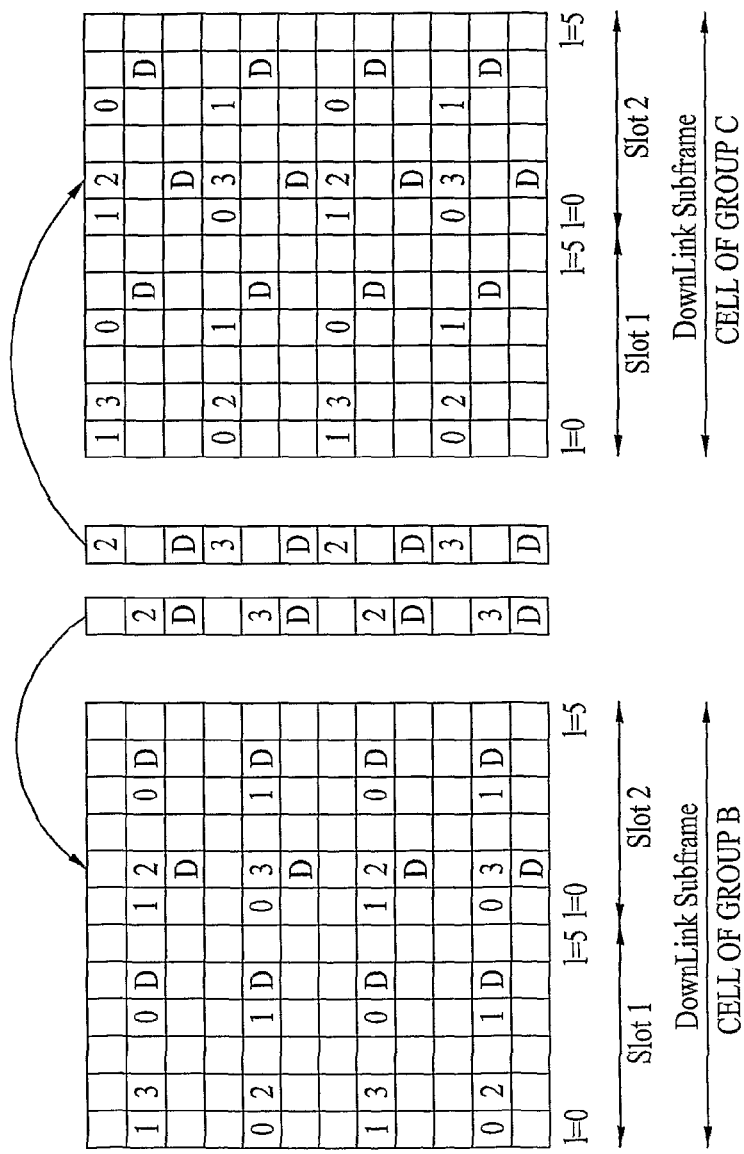

FIG. 25 illustrates CRS and DRS allocation patterns, when CoMP cells are from two groups Group B and Group C according to an exemplary embodiment of the present invention. CoMP cells from Group B and Group C have CRS frequency shift values $v_{shift}$ of 1 and 2, respectively. Thus CRSs of the CoMP cells are shifted along the frequency axis as illustrated in FIG. 25. In order to avoid collision between CRSs and DRSs, DRS frequency shift values of the CoMP cells should be determined based on a frequency shift value $v_{shift}$ corresponding to REs unused for the two groups. For example, based on the DRS allocation patterns defined in the current LTE system, a DRS frequency shift value $v_{shift}$ may be calculated by [Equation 18].

$$\text{DRS } v_{shift}=(\text{CRS } v_{shift} \text{ of Group } A+1)\% \text{ Number of Groups} \quad \text{[Equation 18]}$$

CoMP cells are configured from two of three groups in the above description. On the other hand, CoMP cells may be configured from one of the three cells, which will be described below.

When cells from one of three groups categorized according to CRS frequency shift values $v_{shift}$ serves as CoMP cells, DRSs of the CoMP cells are allocated to REs based on a frequency shift value $v_{shift}$ corresponding to REs unused by the CoMP cells. In the following examples, cells from each of the three groups perform a CoMP operation as CoMP cells and have the same CRS frequency shift value $v_{shift}$. Hence, more REs are available for DRSs than in the foregoing examples. Now a description will be made of CRS and DRS allocation patterns when CoMP cells are from one group.

Case. 1: Cells Only from Group A Serve as CoMP Cells.

Figure 26:
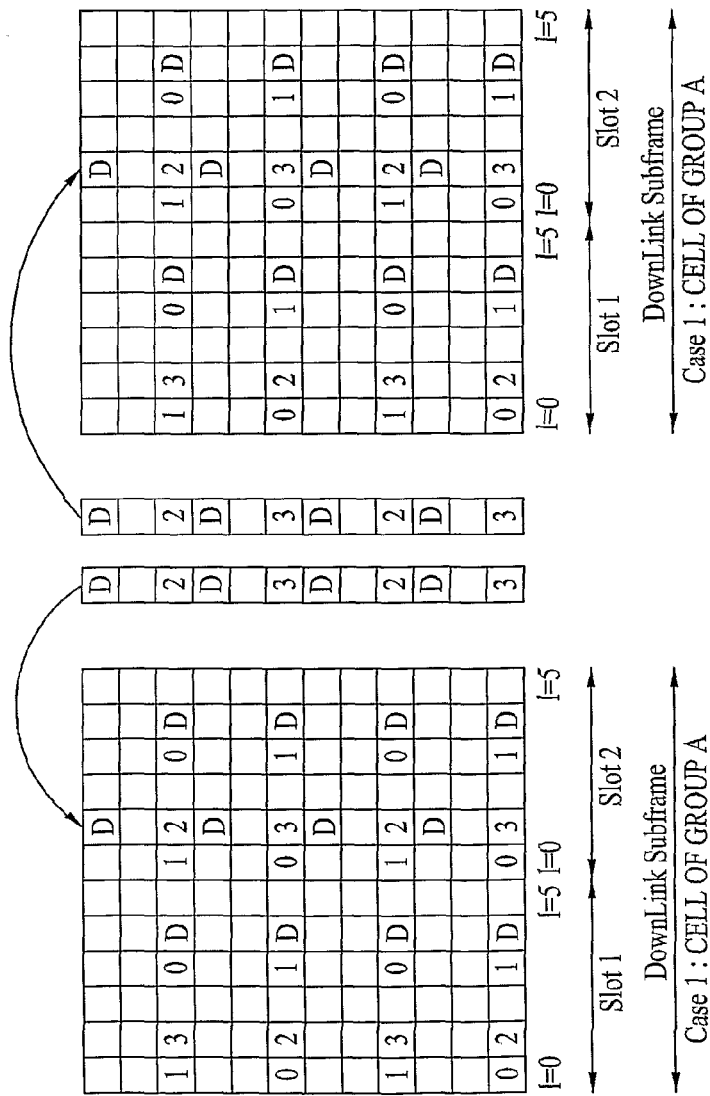
FIGS. 26 and 27 illustrate CRS and DRS allocation patterns, when CoMP cells are only from one group, Group A according to exemplary embodiments of the present invention.
Figure 27:
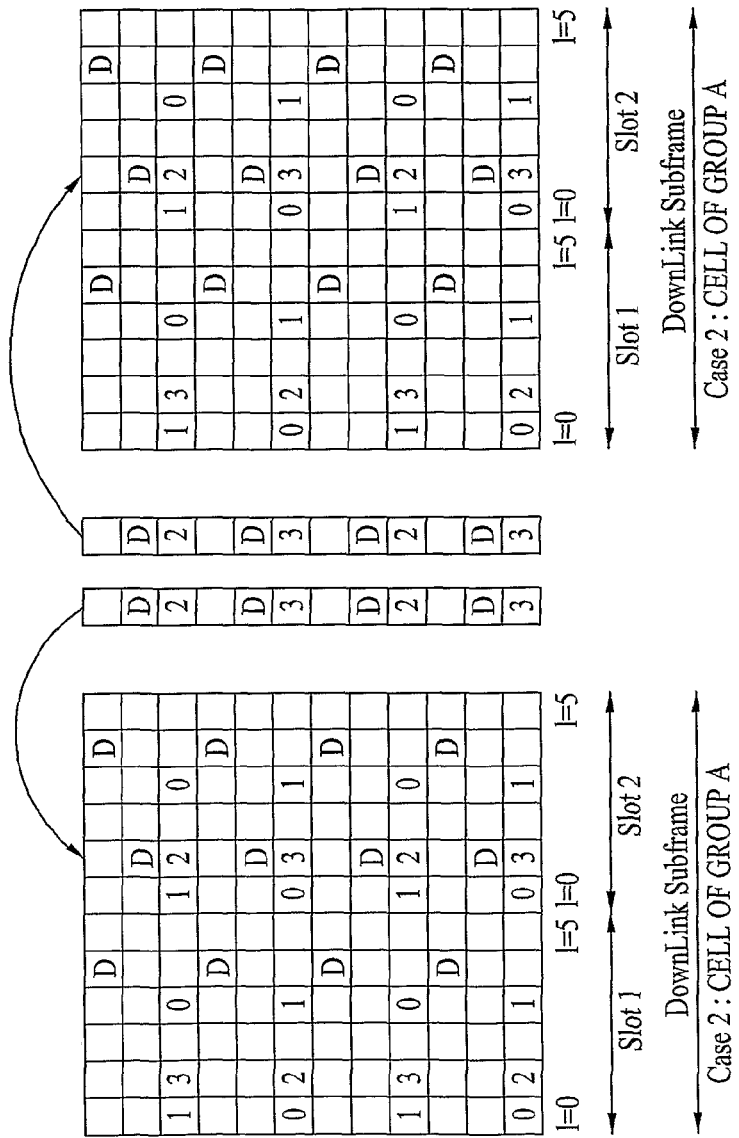

FIGS. 26 and 27 illustrate CRS and DRS allocation patterns, when CoMP cells are from Group A according to exemplary embodiments of the present invention.

Referring to FIGS. 26 and 27, CoMP cells only from Group A have a CRS frequency shift value $v_{shift}$ of 0. Thus CRSs of the CoMP cells are shifted along the frequency axis as illustrated in FIGS. 26 and 27. For example, based on the DRS allocation patterns defined in the current LTE system, a DRS frequency shift value $v_{shift}$ may be calculated by [Equation 19] or [Equation 20]. Then the DRS frequency shift values $v_{shift}=0$ and 2, respectively by [Equation 19] and [Equation 20].

$$\text{DRS } v_{shift}=\text{CRS } v_{shift} \text{ of Group } A \quad \text{[Equation 19]}$$

$$\text{DRS } v_{shift}=(\text{CRS } v_{shift} \text{ of Group } A+2)\% \text{ Number of Groups} \quad \text{[Equation 20]}$$

Case. 2: Cells Only from Group B Serve as CoMP Cells.

Figure 28:
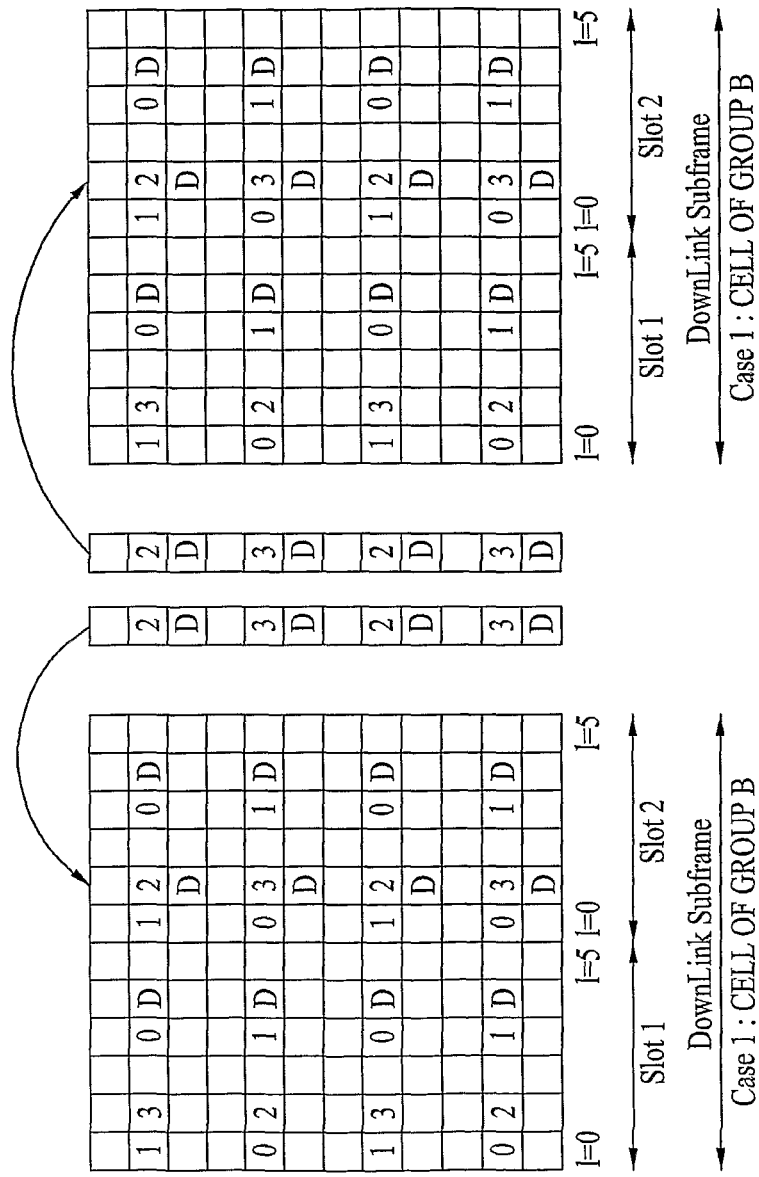
FIGS. 28 and 29 illustrate CRS and DRS allocation patterns, when CoMP cells are only from one group, Group B according to exemplary embodiments of the present invention.
Figure 29:
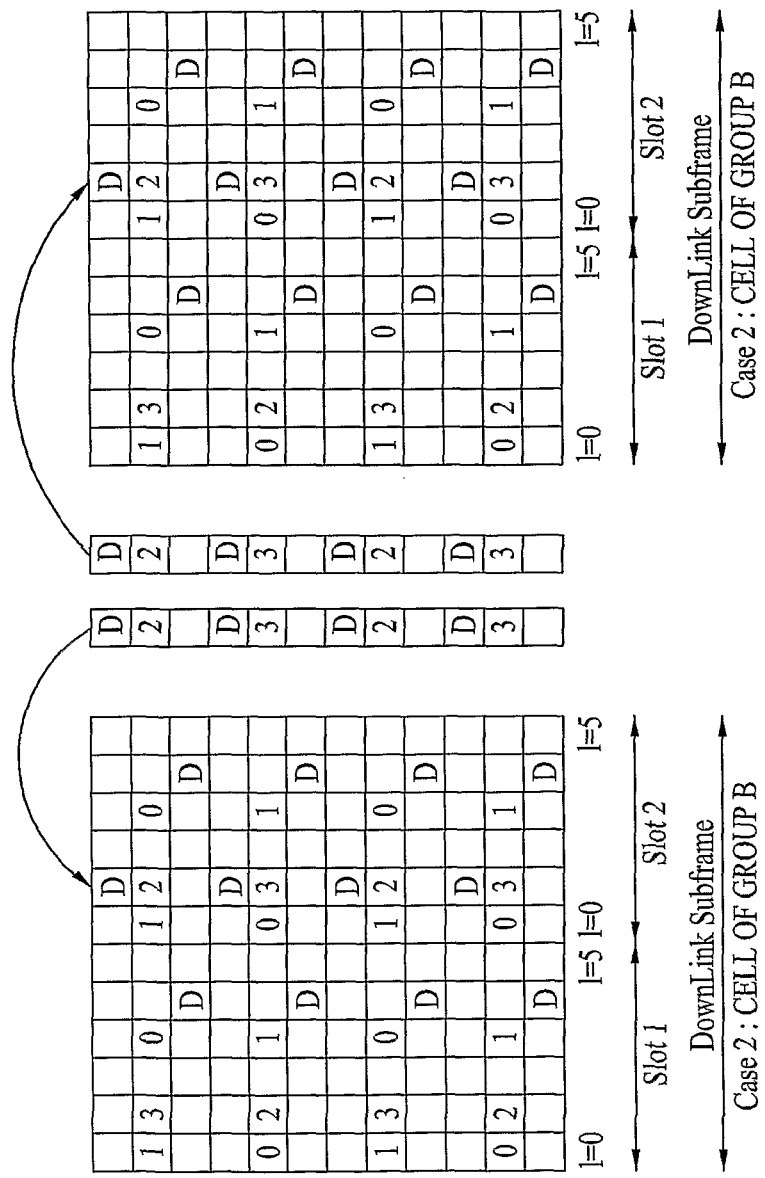

FIGS. 28 and 29 illustrate CRS and DRS allocation patterns, when CoMP cells are only from Group B according to exemplary embodiments of the present invention.

Referring to FIGS. 28 and 29, CoMP cells only from Group B have a CRS frequency shift value $v_{shift}$ of 1. Thus CRSs of the CoMP cells are shifted along the frequency axis as illustrated in FIGS. 28 and 29. For example, based on the DRS allocation patterns defined in the current LTE system, a DRS frequency shift value $v_{shift}$ may be calculated by [Equation 21] or [Equation 22]. Then the DRS frequency shift values $v_{shift}=1$ and 0, respectively by [Equation 21] and [Equation 22].

$$\text{DRS } v_{shift}=\text{CRS } v_{shift} \text{ of Group } B \quad \text{[Equation 21]}$$

$$\text{DRS } v_{shift}=(\text{CRS } v_{shift} \text{ of Group } B+2)\% \text{ Number of Groups} \quad \text{[Equation 22]}$$

Case. 3: Cells Only from Group C Serve as CoMP Cells.

Figure 30:
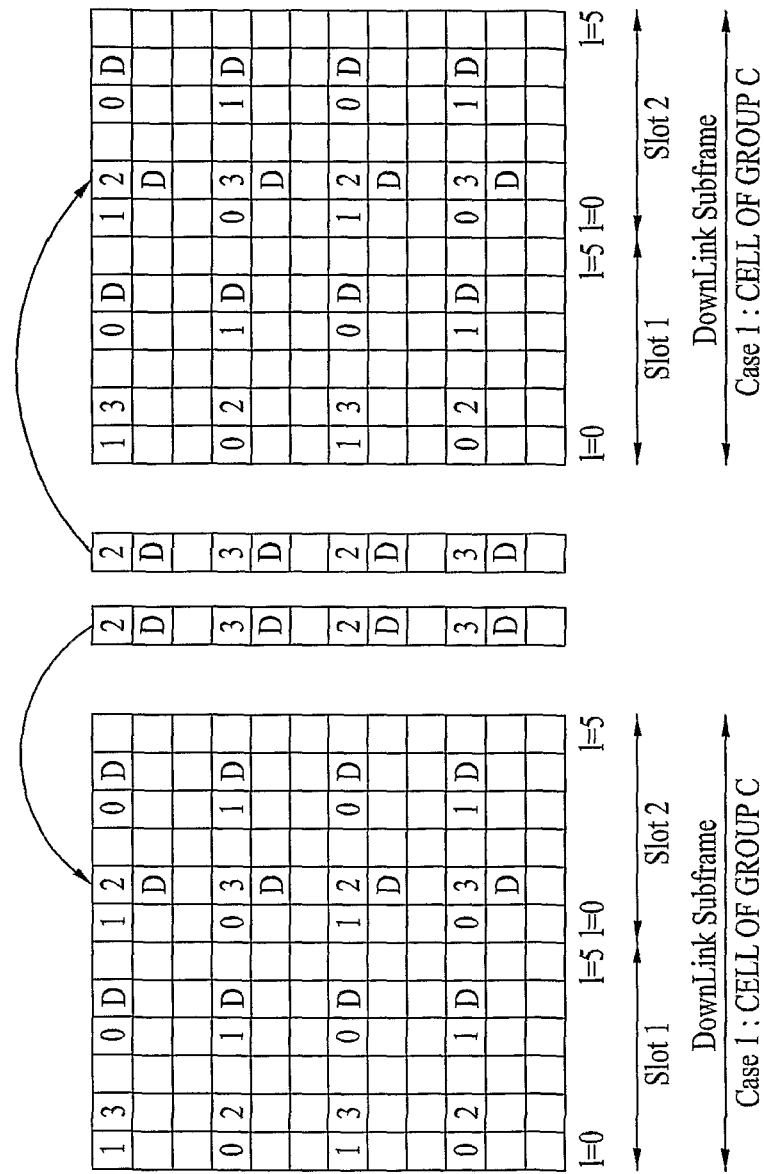
FIGS. 30 and 31 illustrate CRS and DRS allocation patterns, when CoMP cells are only from one group, Group C according to a further exemplary embodiment of the present invention.
Figure 31:
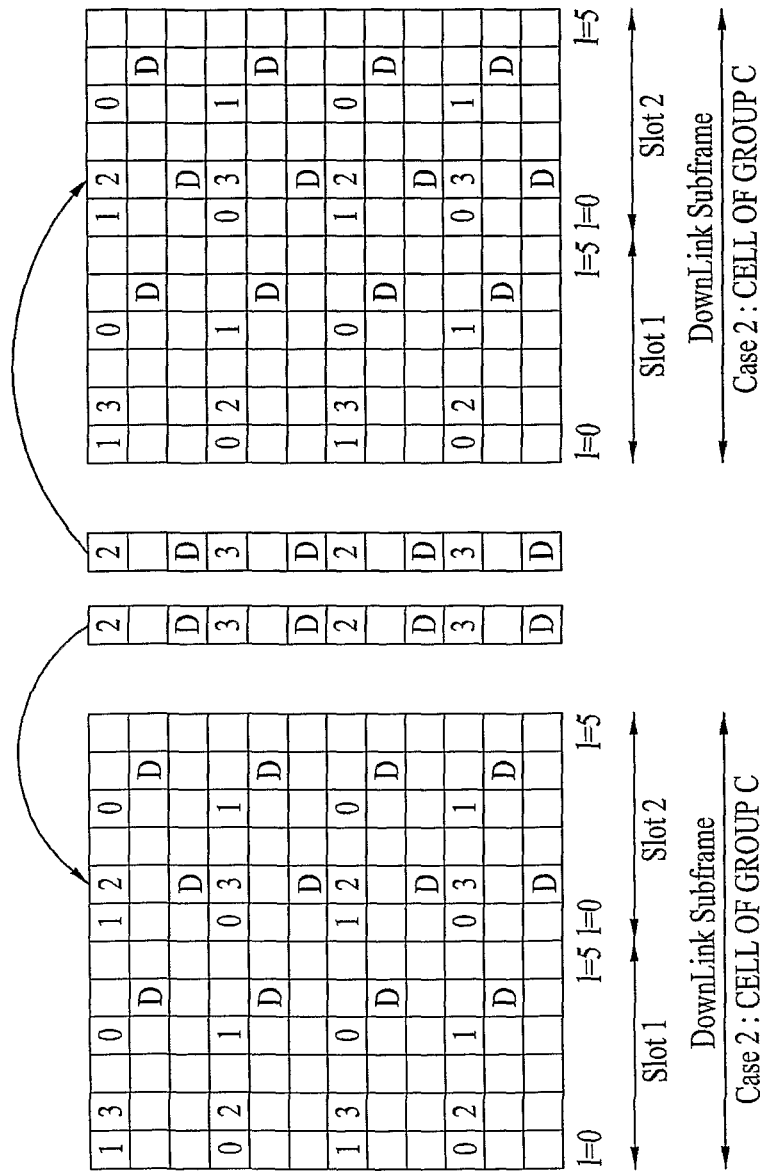

FIGS. 30 and 31 illustrate CRS and DRS allocation patterns, when CoMP cells are from Group C according to exemplary embodiments of the present invention.

Referring to FIGS. 30 and 31, CoMP cells only from Group C have a CRS frequency shift value $v_{shift}$ of 2. Thus CRSs of the CoMP cells are shifted along the frequency axis as illustrated in FIGS. 30 and 31. For example, based on the DRS allocation patterns defined in the current LTE system, a DRS frequency shift value $v_{shift}$ may be calculated by [Equation 23] or [Equation 24]. Then the DRS frequency shift values $v_{shift}=2$ and 1, respectively by [Equation 23] and [Equation 24].

$$\text{DRS } v_{shift}=\text{CRS } v_{shift} \text{ of Group } C \quad \text{[Equation 23]}$$

$$\text{DRS } v_{shift}=(\text{CRS } v_{shift} \text{ of Group } C+2)\% \text{ Number of Groups} \quad \text{[Equation 24]}$$

In the LTE system, each cell has a different cell-specific frequency shift value $v_{shift}$ for RSs. A UE receives cell IDs of cells capable of participating in a CoMP and then a UE can figure out data transmission or information about a CRS allocation pattern of each of the cells from an eNB. Based on the received information, the UE may know REs available to each of the cells and an RS allocation pattern of each of the cells and thus may perform channel measurement and demodulated. However, since cells with different cell IDs from two groups, Group 1 and Group 2 may participate in a CoMP operation, data and CRSs may be position at the same REs between the cells. Therefore, each of the cells should null data in REs carrying CRSs of the other cell. However, the cells may determine whether to null the data in the REs by receiving signaling.

Meanwhile, when CoMP information is signaled to the UE from a higher layer or on a PDCCH, the CoMP information may indicate REs in which data has been nulled or cells or cell groups that have participated in a CoMP operation. The UE may determine the positions or frequency shift value of DRSs $v_{shift}$ using the received CoMP information.

In summary, the above-proposed DRS frequency shift value (DRS $v_{shift}$) indication methods are 1) using DRS frequency shift values derived according to CoMP cells as fixed values, 2) receiving DRS frequency shift values or equivalent information such as information about cell groups that have participated in a CoMP operation by signaling from a higher layer, and 3) receiving DRS frequency shift values or equivalent information such as information about cell groups that have participated in a CoMP operation on a PDCCH.

How CRS and DRS allocation patterns are designed has been described above. However, the CRS and DRS allocation pattern designing methods are not limited to CRSs and DRSs and are applicable to designing CSI-RS and DRS allocation patterns in the same manner.

If CSI-RSs and DRSs of each of CoMP cells are allocated to the same symbol, it may occur that DRSs and CSI-RSs of the CoMP cells are at the same positions, thus causing collision between them. Thus, methods for preventing the DRS-CSI-RS collision will be described below. When joint processing is considered for a CoMP operation, DRSs of different CoMP cells may be shifted so that they share the same resources in exemplary embodiments described below. Accordingly, it is useful that the DRS frequency shift value is UE-specific.

Figure 32:
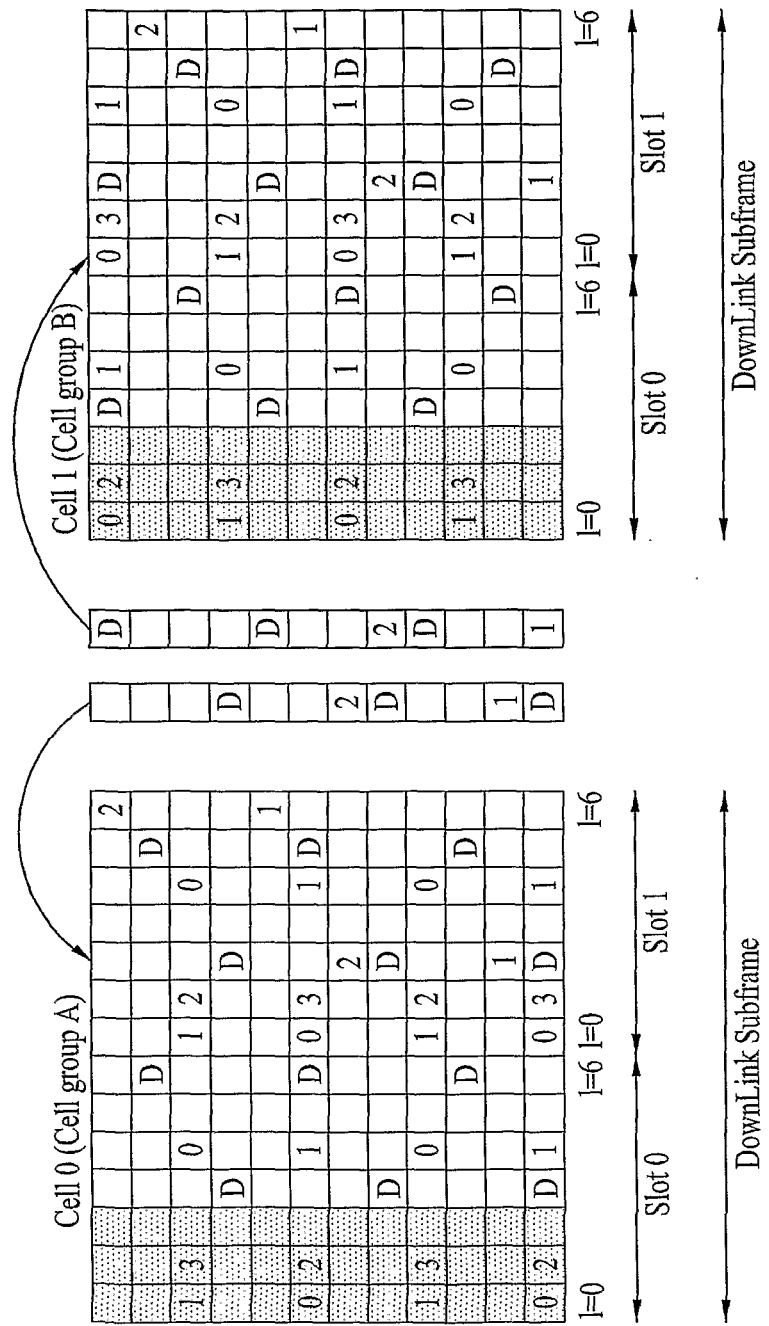
FIG. 32 illustrates CSI-RS and DRS allocation patterns for CoMP cells according to an exemplary embodiment of the present invention.

FIG. 32 illustrates CSI-RS and DRS allocation patterns for CoMP cells according to an exemplary embodiment of the present invention. Referring to FIG. 32, if a CSI-RS frequency shift value $v_{shift}$ is tied to a cell-specific value, that is, a cell ID, DRSs may collide with CSI-RSs in the same REs.

Figure 33:
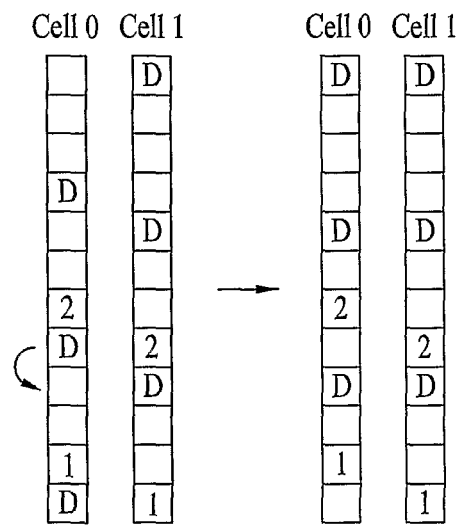
FIG. 33 illustrates shifting of DRSs of a serving cell to avoid collision between DRSs and Channel State Information-Reference Signals (CSI-RSs), when two cells perform a CoMP operation according to an exemplary embodiment of the present invention.

FIG. 33 illustrates shifting of DRSs of a serving cell to avoid collision between DRSs and CSI-RSs, when two cells perform a CoMP operation according to an exemplary embodiment of the present invention. To avoid the DRS-CSI-RS collision, the following operation may be performed. If Cell 0 is a serving cell, DRSs of the serving cell may be shifted to share the same resources with DRSs of another CoMP cell. When needed, Cell 0 may null REs carrying data.

On the other hand, for the DRS shift of the non-serving cell, CSI-RSs of the non-serving cell may also be shifted. For this purpose, it is proposed that a is cell-specific CSI-RS frequency shift value $v_{shift}$ is signaled from a higher layer. That is, CSI-RSs may be shifted for the DRS shift. From the perspective of the higher layer signaling, the CSI-RS frequency shift value $v_{shift}$ may be different from a DRS frequency shift value $v_{shift}$. Also, the frequency shift values $v_{shift}$ of CSI-RS may be signaled in a UE-specific manner. The signaling may be implemented as Radio Resource Control (RRC) signaling or dynamic PDCCH signaling.

Figure 34:
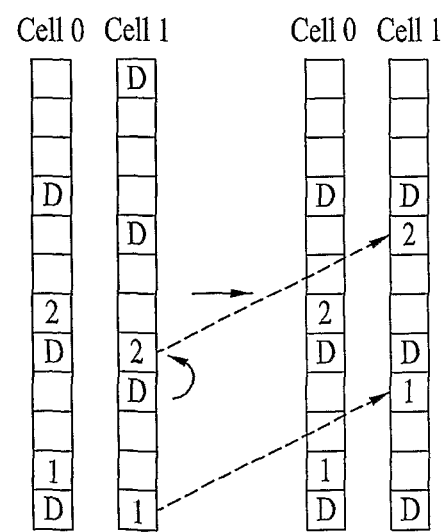
FIGS. 34 and 35 illustrate shifting of CSI-RSs and DRSs of a non-serving cell to avoid collision between DRSs and CSI-RSs, when two cells perform a CoMP operation according to an exemplary embodiment of the present invention.
Figure 35:
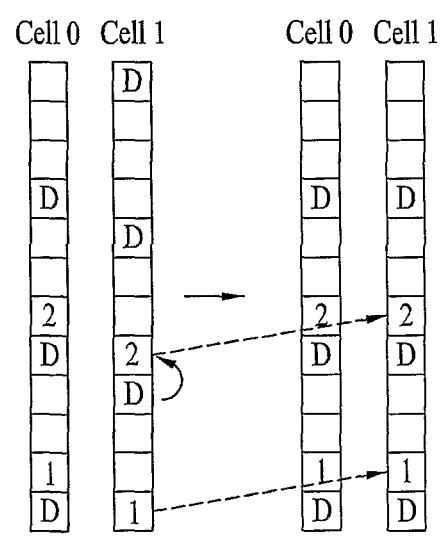

FIGS. 34 and 35 illustrate shifting of CSI-RSs and DRSs of a non-serving cell to avoid collision between DRSs and CSI-RSs, when two cells perform a CoMP operation according to an exemplary embodiment of the present invention. When needed, the non-serving cell may null REs carrying data.

Embodiment 4

Figure 36:
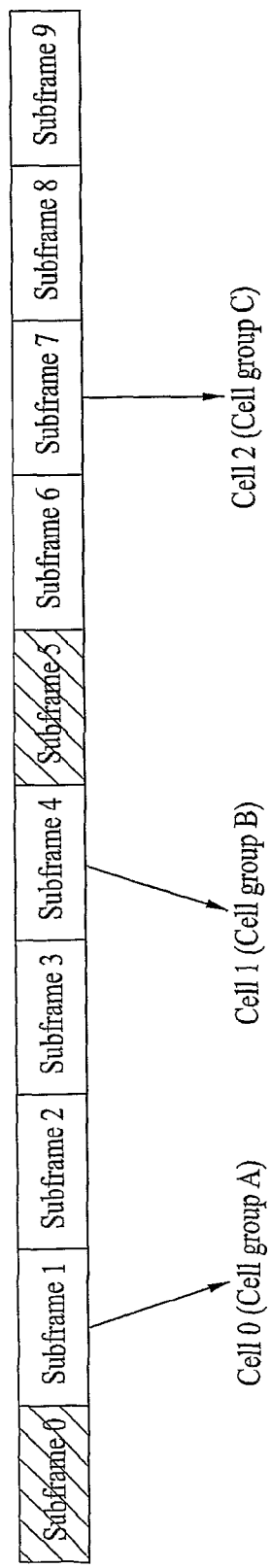
FIG. 36 illustrates a radio frame structure according to an exemplary embodiment of the present invention.
Figure 39:
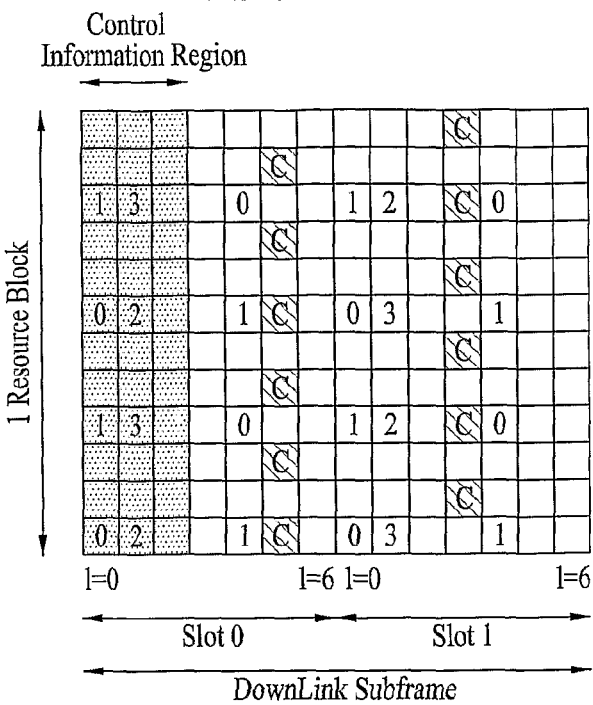
FIGS. 39 to 50 illustrate CSI-RS allocation patterns when a predetermined number of Resource Element (RE) positions are preset for transmission of CSI-RSs according to exemplary embodiments of the present invention.
Figure 40:
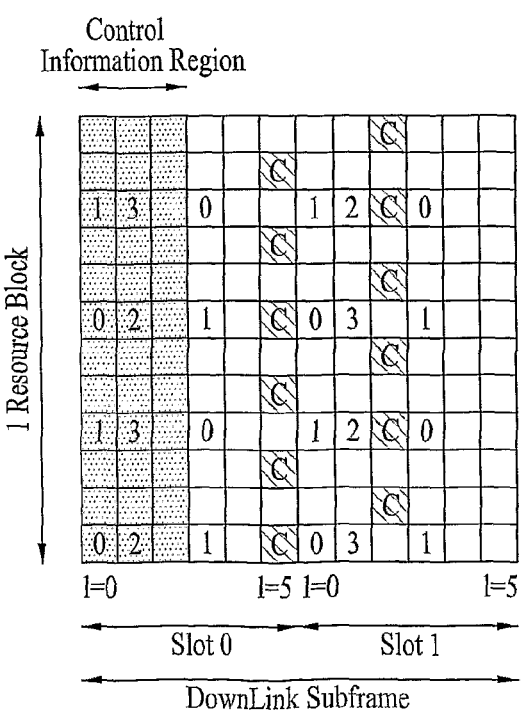
Figure 41:
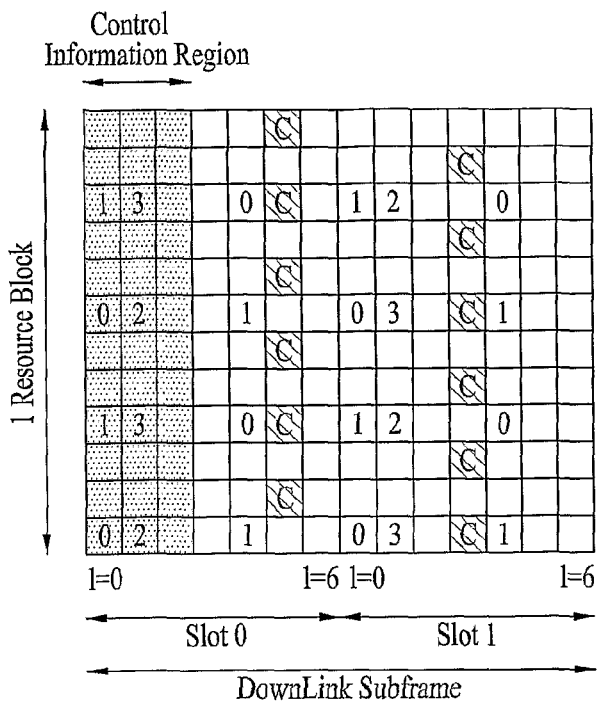
Figure 42:
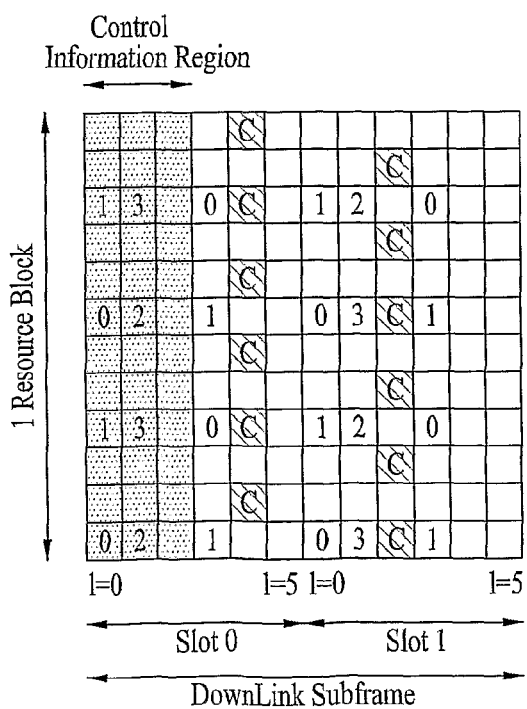
Figure 43:
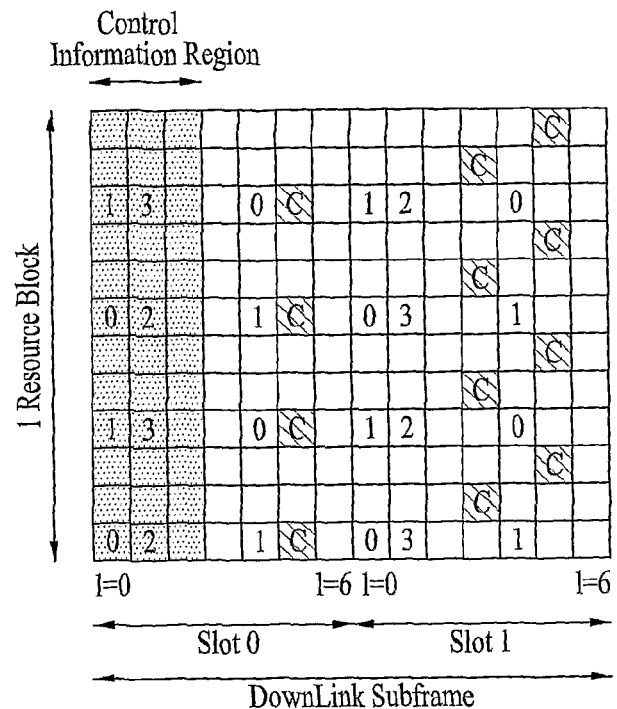
Figure 44:
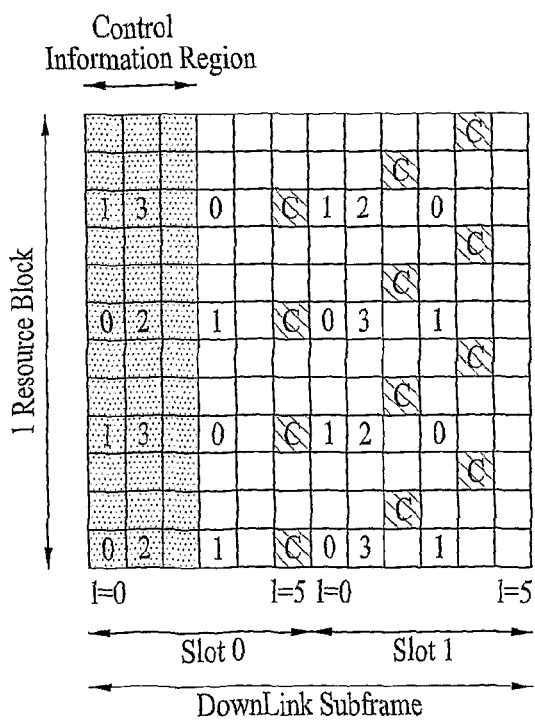
Figure 45:
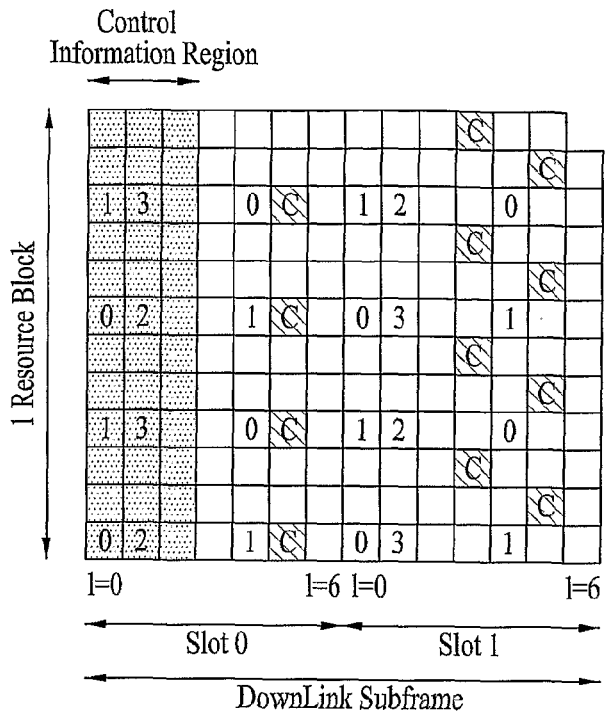
Figure 46:
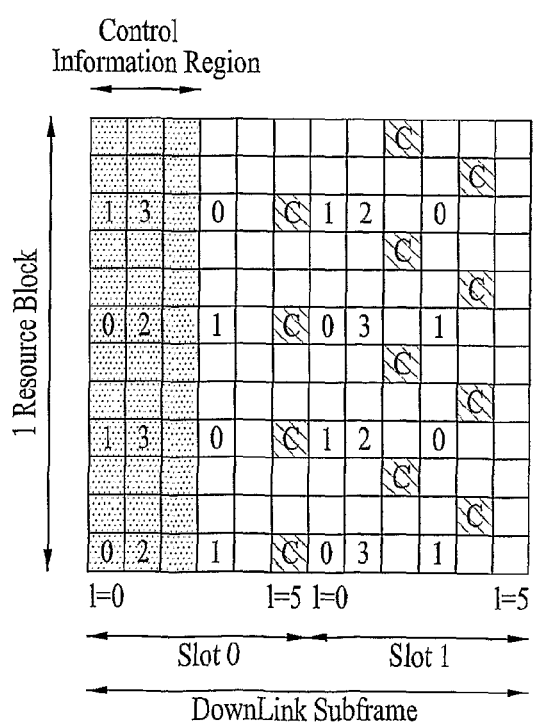
Figure 47:
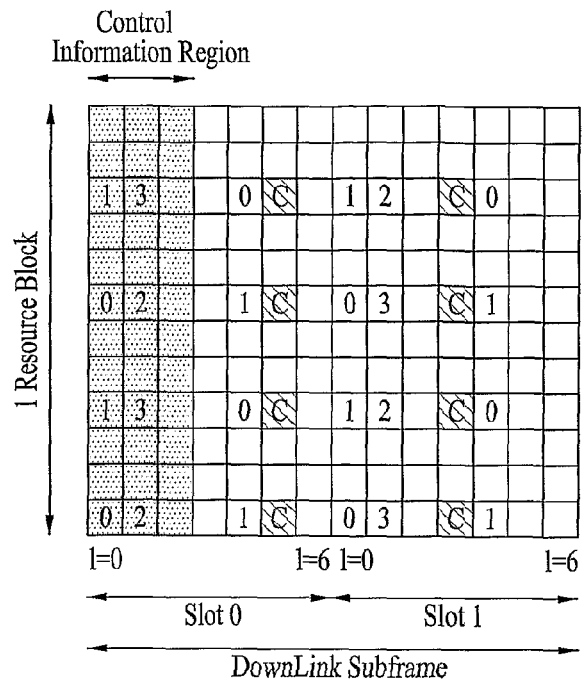
Figure 48:
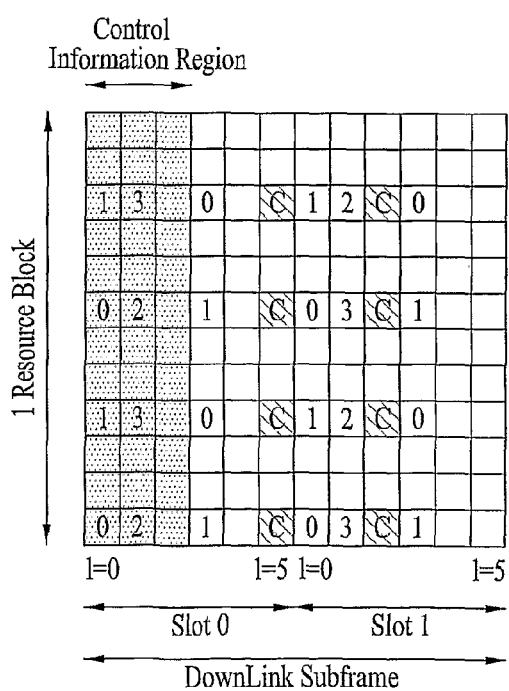
Figure 49:
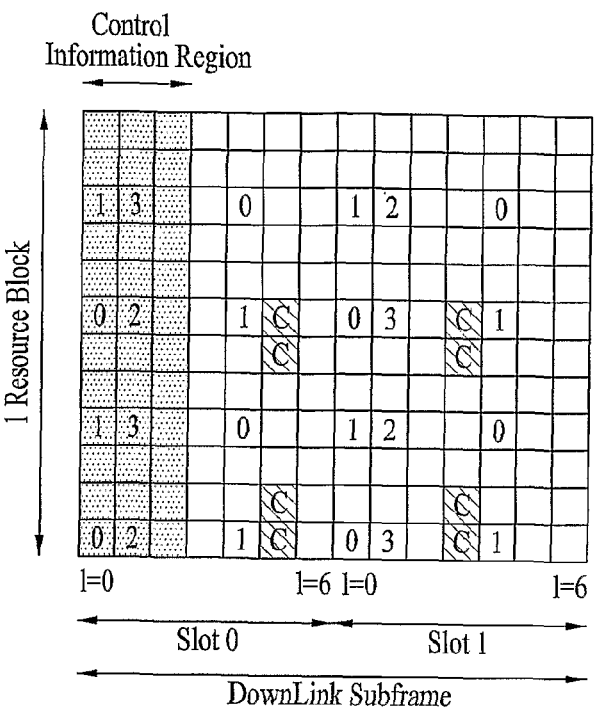
Figure 50:
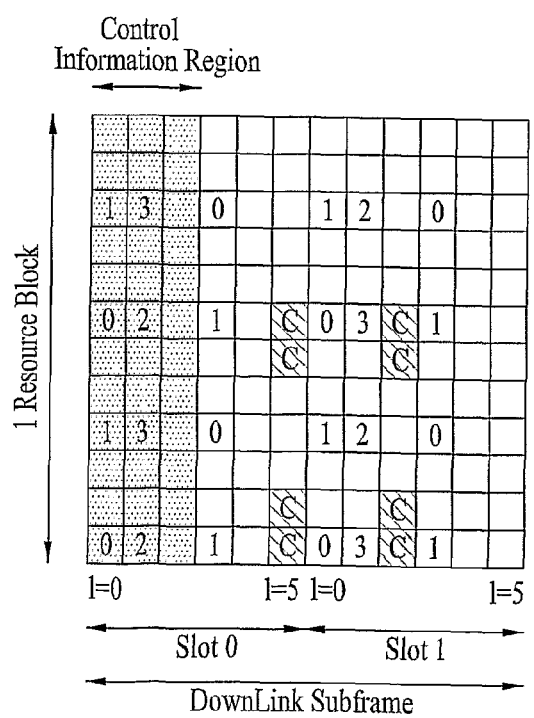

FIG. 36 illustrates a radio frame structure according to an exemplary embodiment of the present invention. In this embodiment, channel information about cells or cell groups participating in a CoMP operation is measured in different subframes. It is assumed in FIG. 36 that second, fifth and eighth subframes, subframe 1, subframe 4 and subframe 7 carry CSI-RSs of Cell 0 (Cell group A), Cell 1 (Cell group B) and Cell 2 (Cell group C), respectively. Due to different subframes carry CSI-RSs of different cells or cell groups, for channel measurement, a problem encountered with measurement of CSI-RSs transmitted in one subframe from different cells, that is, collision between CSI-RSs of different cells that are allocated to the same REs based on cell-specific frequency shift values. Accordingly, there is no need for modifying a CSI-RS format as stated before, in order to support MIMO and CoMP simultaneously. It is known that a smaller number of CSI-RSs suffice for channel measurement. Hence, CSI-RSs may be transmitted every 10 ms.

FIGS. 37 and 38 illustrate subframe structures according to exemplary embodiments of the present invention.

Referring to FIGS. 37 and 38, a UE measures CSI-RSs of Cell 0 (Cell group A) in Subframe 1 and CSI-RSs of Cell 1 (Cell group B) in Subframe 4. If data is punctured in specific REs to reduce interference with another cell, the total number of punctured data REs per subframe is smaller than in a CoMP operation where a plurality of cells transmits RSs for channel measurement in the same subframe. This is because Cell 1 (Cell group B) does not need transmit its channel information in a subframe allocated to Cell 0 (Cell group A). To configure a appropriate subframe for each cell or cell group, an offset, a period, and information may be used. In addition, information indicating whether data nulling is applied or not may be signaled according to channel environment because interference from data REs of a cell may be too weak to affect measurement of CSI-RSs transmitted from another cell. For nulling, a period and an offset may also be used.

Embodiment 5

In this embodiment, a predetermined number of RE positions are preset for dedicated allocation to CSI-RSs. If CSI-RSs are not transmitted in some of the preset REs, the REs are kept vacant. First of all, a common network determines entire RE positions for CSI-RS transmission. Then detailed information about antenna ports, symbol positions, a period, etc. may be configured by higher layer signaling under circumstances. In the absence of signaling, the predetermined number of preset RE positions may be kept vacant.

FIGS. 39 to 50 illustrate CSI-RS allocation patterns when a predetermined number of RE positions are preset for transmission of CSI-RSs according to exemplary embodiments of the present invention. In FIGS. 39 to 50,  represents the preset REs for CSI-RSs. Antenna multiplexing may be performed by CDM, FDM, TDM or a hybrid technique. Preferably, a CDM scheme using 12 preset REs may support 12 antenna ports for a UE without puncturing data in the REs.

Figure 51:
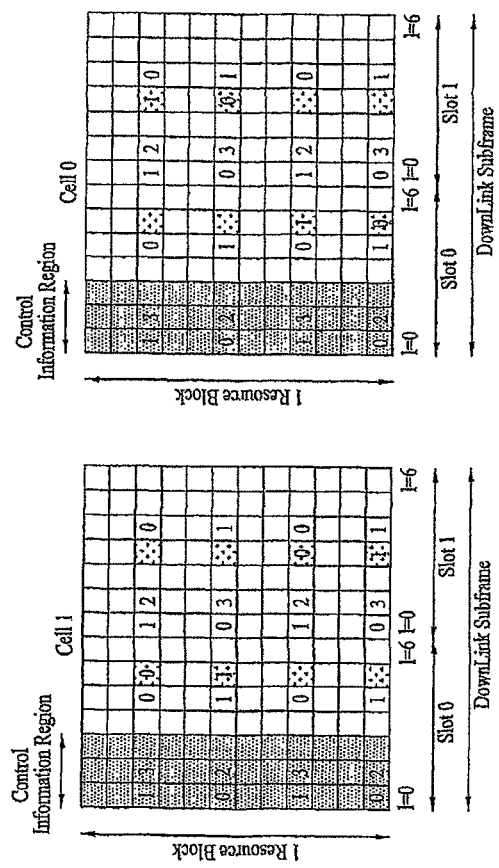
FIG. 51 illustrates CSI-RS allocation patterns for two cells participating in a CoMP operation in Frequency Division Multiplexing (FDM) according to an exemplary embodiment of the present invention.

FIG. 51 illustrates CSI-RS allocation patterns for two cells participating in a CoMP operation in FDM according to an exemplary embodiment of the present invention. If two cells participate in an FDM-CoMP operation, the CSI-RS patterns illustrated in FIG. 51 may be configured by higher layer signaling. CSI-RSs for antenna port 0 and antenna port 1 may be configured based on a cell. Without signaling about additional puncturing of data REs, a cell may avoid interference from another cell. Especially in FDM, the cell-specific frequency shift value $v_{shift}$ of a CoMP cell may be signaled according to preset RE positions. Or preset RE positions for a CoMP cell may be signaled according to the cell-specific frequency shift value $v_{shift}$ of the CoMP cell. Or only limited cells may participate in a CoMP operation without any signaling for allocating preset RE positions. Cell 0 supports antenna port 0 and antenna port 1 for a CoMP operation, as illustrated in FIG. 51. When Cell 0 needs to operate in 4Tx Single User-MIMO (SU-MIMO) by additionally supporting antenna port 2 and antenna port 3, it may transmit CSI-RSs for antenna port 2 and antenna port 3 in a different subframe from a subframe carrying CSI-RSs for antenna port 0 and antenna port 1. Information about the subframe carrying the CSI-RSs for antenna port 2 and antenna port 3 may be indicated by an offset.

The foregoing embodiments have been described above in the context of CoMP, they are also applicable to a relay DwPTS, etc.

Figure 52:
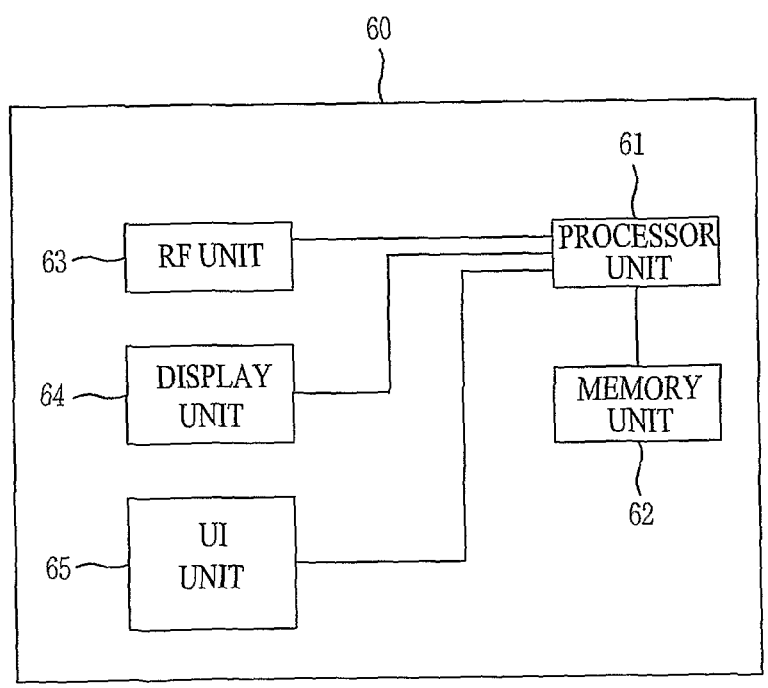
FIG. 52 is a block diagram of an apparatus which is applicable to an evolved Node B (eNB) and a User Equipment (UE), for implementing the methods according to the exemplary embodiments of the present invention.

FIG. 52 is a block diagram of an apparatus which is applicable to an eNB and a UE, for implementing the methods according to the exemplary embodiments of the present invention.

Referring to FIG. 52, an apparatus 60 includes a processor unit 61, a memory unit 62, a Radio Frequency (RF) unit 63, a display unit 64, and a User Interface (UI) unit 65. The processor unit 61 takes charge of physical interface protocol layers and provides a control plane and a user plane. The processor unit 61 may also perform the functionalities of each layer. The memory unit 62 is electrically connected to the processor unit 61 and stores an operating system, application programs, and general files. If the apparatus 60 is a UE, the display unit 64 may display a variety of information and may be implemented with a known Liquid Crystal Display (LCD), an Organic Light Emitting Diode (OLED), or the like. The UI unit 65 may be configured in combination with a known UI like a keypad, a touch screen, etc. The RF unit 63 is electrically connected to the processor unit 61, for transmitting and receiving RF signals.

MODE FOR INVENTION

Various embodiments have been described in the best mode for carrying out the invention.

INDUSTRIAL APPLICABILITY

The present invention is applicable to a UE, an eNB, or other devices in a wireless communication system.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The term 'UE' may be replaced with the term 'Mobile Station (MS)', 'Subscriber Station (SS)', 'Mobile Subscriber Station (MSS)', 'mobile terminal', etc.

The UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

The exemplary embodiments of the present invention may be achieved by various means, for example, hardware, firmware, software, or a combination thereof.

In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for transmitting, by a base station, a reference signal for channel measurement to at least one user equipment, the method comprising:
transmitting, to a user equipment (UE),
first resource configuration information indicating a first time-frequency resource for carrying the reference signal in a first subset of a plurality of subframes,
first subframe configuration information indicating a transmission period for the first subset of the plurality of subframes,
second resource configuration information indicating a second time-frequency resource having zero transmission power in a second subset of the plurality of subframes, and
second subframe configuration information indicating a zero transmission power period for the second subset of the plurality of subframes; and
transmitting, to the UE, the reference signal in the first time-frequency resource based on the first resource configuration information and the first subframe configuration information and setting power to zero in the second time-frequency resource based on the second resource configuration information and the second subframe configuration information,
wherein each subframe of the first subset of the plurality of subframes and the second subset of the plurality of subframes is comprised of two slots identified as slot 0 and slot 1, each of which includes 7 orthogonal frequency division multiplexing (OFDM) symbols identified as OFDM symbols 0 to 6,
wherein the first time-frequency resource is within two OFDM symbols in the first subset of the plurality of subframes, and
wherein the two OFDM symbols are other than OFDM symbols 0, 1, 2 and 4 of the slot 0 and OFDM symbols 0, 1 and 4 of the slot 1.

2. The method of claim 1, wherein each of the first and second time-frequency resources is one of a plurality of reference signal allocation patterns defined for transmission of the reference signal.

3. The method of claim 1,
wherein the first subframe configuration information also indicates an offset for the first subset of the plurality of subframes, and
wherein the second subframe configuration information also indicates an offset for the second subset of the plurality of subframes.

4. The method of claim 1, wherein each of the transmission period and the zero power transmission period corresponds to more than one subframe.

5. A method for receiving a reference signal for channel measurement, the method comprising:
receiving, by a user equipment (UE), first resource configuration information indicating a first time-frequency resource for carrying the reference signal in a first subset of a plurality of subframes, first subframe configuration information indicating a transmission period for the first subset of the plurality of subframes, second resource configuration information indicating a second time-frequency resource having zero transmission power in a second subset of the plurality of subframes, and second subframe configuration information indicating a zero transmission power period for the second time-frequency resource; and receiving, by the UE, the reference signal in the first time-frequency resource based on the first resource configuration information and the first subframe configuration information and not receiving data on the second time-frequency resource based on the second resource configuration information and the second subframe configuration information, wherein power is set to zero in the second time-frequency resource based on the second resource configuration information and the second subframe configuration information, wherein each of the first subset of the plurality of subframes and the second subset of the plurality of subframes is comprised of two slots identified as slot 0 and slot 1, each of which includes 7 orthogonal frequency division multiplexing (OFDM) symbols identified as OFDM symbols 0 to 6, wherein the first time-frequency resource is within two OFDM symbols in the first subset of the plurality of subframes, and wherein the two OFDM symbols are other than OFDM symbols 0, 1, 2 and 4 of the slot 0 and OFDM symbols 0, 1 and 4 of the slot 1.

6. The method of claim 5, wherein each of the first and second time-frequency resources is one of a plurality of reference signal allocation patterns defined for transmission of the reference signal.

7. The method of claim 5, wherein the first subframe configuration information also indicates an offset for the first subset of the plurality of subframes, and wherein the second subframe configuration information also indicates an offset for the second subset of the plurality of subframes.

8. The method of claim 5, wherein each of the transmission period and the zero power transmission period corresponds to more than one subframe.

9. A base station configured to transmit a reference signal for channel measurement to at least one user equipment, the base station comprising:

a processor unit; and a radio frequency unit, electrically connected to the processor unit, configured to transmit, to a user equipment (UE), first resource configuration information indicating a first time-frequency resource for carrying the reference signal in a first subset of a plurality of subframes, first subframe configuration information indicating a transmission period for the first subset of the plurality of subframes, second resource configuration information indicating a second time-frequency resource having zero transmission power in a second subset of the plurality of subframes, and second subframe configuration information indicating a zero transmission power period for the second time-frequency resource; and transmit, to the UE, the reference signal in the first time-frequency resource based on the first resource configuration information and the first subframe configuration information and set power to zero in the second time-frequency resource based on the second resource configuration information and the second subframe configuration information, wherein each of the first subset of the plurality of subframes and the second subset of the plurality of subframes is comprised of two slots identified as slot 0 and slot 1, each of which includes 7 orthogonal frequency division multiplexing (OFDM) symbols identified as OFDM symbols 0 to 6, wherein the first time-frequency resource is within two OFDM symbols in the first subset of the plurality of subframes, and wherein the two OFDM symbols are other than OFDM symbols 0, 1, 2 and 4 of the slot 0 and OFDM symbols 0, 1 and 4 of the slot 1.

10. The base station of claim 9, wherein each of the first and second time-frequency resources is one of a plurality of reference signal allocation patterns defined for transmission of the reference signal.

11. The base station of claim 9, wherein the first subframe configuration information also indicates an offset for the first subset of the plurality of subframes, and wherein the second subframe configuration information also indicates an offset for the second subset of the plurality of subframes.

12. The base station of claim 9, wherein each of the transmission period and the zero power transmission period corresponds to more than one subframe.

13. A user equipment configured to receive a reference signal for channel measurement, the user equipment comprising:

a processor unit; and a radio frequency unit, electrically connected to the processor unit, configured to receive first resource configuration information indicating a first time-frequency resource for carrying the reference signal in a first subset of a plurality of subframes, first subframe configuration information indicating a transmission period for the first subset of the plurality of subframes, second resource configuration information indicating a second time-frequency resource having zero transmission power in a second subset of the plurality of subframes, and second subframe configuration information indicating a zero transmission power period for the second time-frequency resource; and receive the reference signal in the first time-frequency resource based on the first resource configuration information and the first subframe configuration information and not receive data on the second time-frequency resource based on the second resource configuration information and the second subframe configuration information, wherein power is set to zero in the second time-frequency resource based on the second resource configuration information and the second subframe configuration information, wherein each of the first subset of the plurality of subframes and the second subset of the plurality of subframes is comprised of two slots identified as slot 0 and slot 1, each of which includes 7 orthogonal frequency division multiplexing (OFDM) symbols identified as OFDM symbols 0 to 6, wherein the first time-frequency resource is within two OFDM symbols in the first subset of the plurality of subframes, and wherein the two OFDM symbols are other than OFDM symbols 0, 1, 2 and 4 of the slot 0 and OFDM symbols 0, 1 and 4 of the slot 1.

14. The user equipment of claim 13, wherein each of the first and second time-frequency resources is one of a plurality of reference signal allocation patterns defined for transmission of the reference signal.

15. The user equipment of claim 13,
wherein the first subframe configuration information also indicates an offset for the first subset of the plurality of subframes, and
wherein the second subframe configuration information also indicates an offset for the second subset of the plurality of subframes.

16. The user equipment of claim 13, wherein each of the transmission period and the zero power transmission period corresponds to more than one subframe.

* * * * *